United States Patent
Lee et al.

[11] Patent Number: 5,937,000
[45] Date of Patent: *Aug. 10, 1999

[54] METHOD AND APPARATUS FOR EMBEDDING AUXILIARY DATA IN A PRIMARY DATA SIGNAL

[75] Inventors: Chong U. Lee, San Diego; Kamran Moallemi, Del Mar; Robert L. Warren, Cardiff, all of Calif.

[73] Assignee: Solana Technology Development Corporation, San Diego, Calif.

[*] Notice: This patent is subject to a terminal disclaimer.

[21] Appl. No.: 08/764,096

[22] Filed: Dec. 6, 1996

Related U.S. Application Data

[63] Continuation-in-part of application No. 08/524,132, Sep. 6, 1995, Pat. No. 5,822,360.

[51] Int. Cl.[6] .............................. H04B 1/707; H04B 1/69
[52] U.S. Cl. ........................ 375/200; 375/206; 370/493; 370/495; 370/497; 370/527; 370/529; 704/201; 704/219
[58] Field of Search ................................ 375/200, 206, 375/208, 267, 285, 296, 346, 347, 349, 350, 367, 241, 242; 370/335, 342, 493, 494, 495, 497, 527, 529; 395/2.28; 704/200, 201, 203, 214, 219, 262, 269

[56] References Cited

U.S. PATENT DOCUMENTS

| | | |
|---|---|---|
| 3,845,391 | 10/1974 | Crosby . |
| 4,079,419 | 3/1978 | Siegle et al. . |
| 4,313,197 | 1/1982 | Maxemchuk . |
| 4,425,661 | 1/1984 | Moses et al. . |
| 4,534,054 | 8/1985 | Maisel . |
| 5,113,437 | 5/1992 | Best et al. . |
| 5,319,735 | 6/1994 | Preuss et al. ........................ 395/2.14 |
| 5,361,276 | 11/1994 | Subramanian ........................ 375/1 |
| 5,379,345 | 1/1995 | Greenberg . |
| 5,404,377 | 4/1995 | Moses . |
| 5,414,733 | 5/1995 | Turner ................................ 375/233 |
| 5,450,490 | 9/1995 | Jensen et al. . |
| 5,481,570 | 1/1996 | Winters ............................... 375/347 |
| 5,487,087 | 1/1996 | McCree et al. ...................... 375/245 |
| 5,561,687 | 10/1996 | Turner ................................ 375/233 |
| 5,568,514 | 10/1996 | McCree et al. ...................... 375/245 |
| 5,694,426 | 12/1997 | McCree et al. ...................... 375/243 |

*Primary Examiner*—Jason Chan
*Assistant Examiner*—Jean B. Corrielus
*Attorney, Agent, or Firm*—Barry R. Lipsitz; Ralph F. Hoppin

[57] ABSTRACT

Auxiliary data is transported in a primary data signal by hiding the data in the form of colored noise. The colored noise has a spectrum that simulates the spectrum of the primary data signal. The data to be transported is first converted to a spread spectrum signal. The primary data signal is analyzed to determine its spectral shape. The same spectral shape is imparted to the spread spectrum signal, which is then combined with the primary data signal for transmission. The spectral shaping can be performed using time domain modeling and synthesis such as linear predictive coding or by using subband coding techniques such as fast Fourier transforms. A plurality of different auxiliary information streams can be transported on the primary data signal. By adjusting the gain of individual spread spectrum signal carrier(s) and the power of the colored noise, the auxiliary information stream(s) can be rendered at a desired level at, below or above an interference threshold in the primary data signal.

69 Claims, 17 Drawing Sheets

METHOD AND APPARATUS FOR EMBEDDING AUXILIARY DATA IN A PRIMARY DATA SIGNAL

This is a continuation-in-part of application Ser. No. 08/524,132, filed Sep. 6, 1995, to C. Lee et al., no U.S. Pat. No. 5,822,360, entitled "Method and Apparatus for Transporting Auxiliary Data in Audio Signals."

BACKGROUND OF THE INVENTION

The present invention relates to a method and apparatus for embedding (e.g., hiding) data in a primary or host data signal, and more particularly to a scheme for inserting one or more auxiliary data signals into a primary data signal being communicated over existing channels. The primary data signal may include an electromagnetic or acoustic signal, for example, which provides an analog or digital representation of the data. Methods and apparatus for recovering the embedded data from the primary data signal are also disclosed, along with specific applications of the invention.

The capacity of a transmission channel to carry information is limited by the bandwidth of the channel. Since the bandwidth of wireless communication channels is limited, techniques have been developed for increasing the amount of information that can be carried within a channel of a given bandwidth. For example, techniques for compressing digital data to squeeze more data within a given bandwidth or data storage space are well known.

Another approach to communicating additional data within a given bandwidth is to identify areas where supplemental information can be transported with a primary signal, without adversely affecting the transport of the primary signal itself. Such techniques can be used in combination with known compression methods. One such technique is the transport of data together with a primary data signal, where the bandwidth of the channel remains as is, and additional information is packed with the primary data such that the additional information can be retrieved without substantially degrading the quality of the primary data signal.

A primary electromagnetic (EM) signal may include frequency components which are below the audible range (e.g., 0.5 to 20 Hz), in the audible range (e.g., 20 Hz to 20,000 Hz), and above the audible range (e.g., above 20,000 Hz). So-called long wave signals have frequency components from approximately 0.1 Hz to 0.1 MHz. Radio wave signals have frequency components from approximately 1 MHz to 1 GHz, and include the amplitude modulation (AM) band, amateur radio band, frequency modulation (FM) band and television band. Microwave signals have frequency components from 1 GHz to 1 TeraHertz (THz). The EM spectrum extends further to the infrared, visible light, ultraviolet, x-ray and gamma ray ranges.

One method for embedding digital information in a primary data signal such as an audio signal is disclosed in U.S. Pat. No. 5,319,735 entitled "Embedded Signalling." This patent discloses the generation of a code signal representing a sequence of code symbols to be embedded, the code signal having frequency components essentially confined to a preselected signalling band lying within and less than the bandwidth of the audio signal. The audio signal is continuously frequency analyzed over a frequency band encompassing the signalling band. The code signal is dynamically filtered as a function of the analysis to provide a modified code signal with frequency component levels which, at each time instant, are essentially negligibly small outside the signalling band. At each frequency within the signalling band, the frequency component levels of the modified code signal are essentially a preselected proportion of the levels of the audio signal frequency components in a corresponding frequency range. The modified code signal is combined with the audio signal to provide a composite audio signal. The frequency analysis and dynamic filtering is accomplished using a large bank of bandpass filters, which leads to a rather complicated and expensive implementation that may have limited practical value.

It would be advantageous to provide a more robust scheme for hiding data in a primary data signal which has frequency components below, in, and/or above the audible range. Such a scheme should enable a plurality of different data streams to be carried with the primary data signal without substantially altering the quality of the primary data signal, where different data streams may be provided at different data rates and combined in any number of ways prior to being added to the primary data signal. Different data streams or combinations thereof should also be able to be added to the primary data signal in a "cascade" approach after other streams have already been added to the primary data signal. The combined data streams should be able to be provided at different levels (i.e., with different gains) in the primary data signal and the power of the combined streams should be adjustable to maintain the combination at a desired level within the primary data signal.

Further, the type of information carried by the primary data signal should be virtually unlimited. For example, it would be advantageous to allow data that is completely unrelated to the primary data signal to be carried. Similarly, it would be advantageous to enable data ancillary to the primary data to be carried, such as data for effecting a copy protection scheme which precludes the primary data signal from being copied without proper authorization, or for otherwise controlling the use of the program or other information (e.g., video or multimedia) which is associated with the primary data signal. Information identifying the content of the primary data signal, such as the name and/or performers of an audio or video program, and polling information for market research or commercial verification might also be hidden using such a scheme. Further, the scheme should the hiding of either a modulated carrier, an unmodulated carrier (e.g., pilot), or a combination of both in the primary data signal.

The present invention relates to methods and apparatus for transporting and recovering information hidden in a primary data signal having the aforementioned and other advantages.

SUMMARY OF THE PRESENT INVENTION

In accordance with the present invention, a method is provided for hiding auxiliary information in a primary data signal for communication to a receiver. A pseudorandom noise carrier is modulated by the auxiliary information to provide a spread spectrum signal carrying the information. The pseudorandom noise carrier may have a flat spectrum but this is not required when there is a priori knowledge that the spectrum is not flat. The primary data signal is evaluated to determine its spectral shape. A carrier portion of the spread spectrum signal is spectrally shaped (i.e., "colored") to simulate the spectral shape of the primary data signal. The spread spectrum signal having the spectrally shaped carrier portion is combined with the primary data signal to produce an output signal carrying the auxiliary information as random noise in the primary data signal.

In an illustrated embodiment, the output signal comprises the sum of the spread spectrum signal and the primary data signal. The auxiliary information can be coded using a forward error correction (FEC) code prior to the modulating step so that the auxiliary information modulates the carrier in the form of FEC data.

A method is provided for recovering the auxiliary information from the output signal, in which the spectral shape of the output signal is determined. The output signal is then processed, based on the determined spectral shape, to flatten (i.e., "whiten") the carrier portion of the spread spectrum signal contained in the output signal, if necessary. The spread spectrum signal is demodulated after the carrier portion has been whitened to despread the spread spectrum signal to recover the FEC data. The FEC data is then decoded to recover the auxiliary information. In an embodiment where the auxiliary information is not FEC coded, the auxiliary information is directly recovered from the despread spread spectrum signal.

The step of evaluating the primary data signal to determine its spectral shape can use time domain modeling, such as linear predictive coding (LPC) techniques. LPC is particularly advantageous because it provides a prediction gain that can be used, for example, to reduce the power of the primary data signal In such an embodiment, LPC coefficients are provided for use in spectrally shaping the carrier of the spread spectrum signal. In order to determine the spectral shape of the output signal for use in recovering the auxiliary information at a decoder, counterpart LPC coefficients can be independently derived from the spectral shape of the output signal. The counterpart LPC coefficients are provided for use in processing the output signal to whiten the carrier portion.

The power of the spread spectrum signal can be adjusted prior to combining it with the primary data signal. Moreover, power adjustment may occur either before or after the spectral shaping of the spread spectrum signal. The adjustment can be used, for example, to render the spread spectrum signal below a predetermined threshold in the primary data signal. For example, when the primary data signal contain audible components, it may be desirable to make the spread spectrum signal substantially inaudible. This may be achieved by providing the spread spectrum signal at a specific signal-to-noise ratio (SNR) of, for example, −40 dB. Moreover, when the primary data signal contains sub-audible and/or supra-audible frequency components, the allowable SNR may be adjusted to provide an acceptable noise level (e.g., interference level) across the spectrum of the primary data signal. The adjustment can also be used to render the spread spectrum signal at increasingly higher noise levels in an additive fashion, such that the quality of successive copies of a recorded primary data signal will degrade more with each new copy.

It is also possible to hide a plurality of auxiliary information signals on the primary data signal. In order to accomplish this, a plurality of pseudorandom noise carriers is modulated by auxiliary information signals to provide a plurality of spread spectrum signals. The carriers, which are spectrally shaped to simulate the spectral shape of the primary data signal, are combined with the primary data signal to produce the output signal. In one embodiment, each of the carriers is individually spectrally shaped prior to its combination with the primary data signal. In another embodiment, the carriers are combined before they are spectrally shaped, and the combined carriers are spectrally shaped as a group prior to their combination with the primary data signal. In a hybrid embodiment, some of the carriers can be individually spectrally shaped prior to their combination with the primary data signal, with other carriers being combined as a group before being spectrally shaped and combined with the primary data signal.

In order to recover the auxiliary information from an output signal in which a plurality of auxiliary information signals is hidden, the spectral shape of the output signal is determined. The output signal is processed, based on its spectral shape, to whiten the carrier portions of the spread spectrum signals contained therein. A desired spread spectrum signal is demodulated after the carrier portion has been whitened. The spread spectrum signal is despread during demodulation to recover the auxiliary information carried therein.

The pseudorandom noise carrier can be generated cryptographically to provide secure communication of the auxiliary information to a receiver. In such an embodiment, a secure cryptographic key can be provided at both the transmitter and receiver. The key is used to generate the pseudorandom noise carrier in accordance with a well known cryptographic algorithm, such as the data encryption standard (DES). Without having the same key at both the transmitter and receiver, it will not be possible to produce the same pseudorandom noise carrier at the transmitter and receiver. Thus, without the proper key, the particular pseudorandom noise carrier necessary to recover the auxiliary information at the receiver cannot be derived. This fact precludes the recovery of the auxiliary information by parties that are not authorized with the proper key. Other known encryption algorithms, including public and private key schemes, can be used to encrypt the pseudorandom noise carrier.

An apparatus is provided for hiding auxiliary information in a primary data signal for communication to a receiver. The apparatus includes means for converting a data stream of the auxiliary information into a spread spectrum signal carrying the information. Means are provided for evaluating the primary data signal to determine its spectral shape. Means responsive to the evaluating means spectrally shape a carrier portion of the spread spectrum signal to simulate the spectral shape of the primary data signal. The spread spectrum signal having the spectrally shaped carrier portion is combined with the primary data signal to produce an output signal carrying the auxiliary information as substantially random noise in the primary data signal. Optionally, means can be provided for adjusting the power of the spread spectrum signal prior to the combining means, to render the spread spectrum signal at a desired level (e.g., below an audible threshold or allowable noise or interference threshold) in the primary data signal. Also optionally, means can be provided for coding the auxiliary information using a forward error correction code before converting the auxiliary information into the spread spectrum signal.

In one illustrated embodiment, the evaluating means comprise a linear predictive coding (LPC) processor coupled to receive the primary data signal and generate LPC coefficients therefrom. The means for spectrally shaping the carrier portion comprise an LPC filter responsive to the LPC coefficients.

In an alternate embodiment for carrying multiple streams of auxiliary information in a primary data signal, the evaluating means comprise a subband analyzer coupled to receive and estimate the spectrum of the primary data signal. The means for spectrally shaping the carrier portion comprise a subband filter responsive to the subband analyzer for processing the carrier portion. In an illustrated embodiment, the subband analyzer comprises a first fast Fourier transform (FFT) processor. The subband filter comprises a second FFT processor for processing the carrier portion, as well as weighting means for frequency weighting FFT outputs from the first and second FFT processors, and a third inverse FFT processor for processing an output of the weighting means to provide the spectrally shaped carrier portion.

An apparatus is provided for recovering the auxiliary information from the output signal that contains the combined primary data signal and spread spectrum signal. This apparatus includes means for determining the spectral shape of the output signal. Means are provided for processing the output signal, based on the spectral shape determined by the determining means, to whiten the carrier portion of the spread spectrum signal contained in the output signal. Means are provided for demodulating the spread spectrum signal after the carrier portion has been whitened to obtain and despread the spread spectrum signal and recover the auxiliary information.

In an embodiment where the spectral shaping is performed using linear predictive coding at the encoder, the decoder can comprise an LPC processor coupled to receive the output signal and generate LPC coefficients therefrom. Advantageously, the LPC coefficients will be derived at the decoder independently of the encoder, so that there is no need to communicate the coefficients from the encoder to the decoder. In order to whiten the carrier portion of the spread spectrum signal, the decoder can comprise an LPC filter responsive to the locally derived LPC coefficients. The use of such an LPC filter provides the advantageous prediction gain previously mentioned.

Where the encoder codes the auxiliary information using an FEC code, the decoder will include an FEC decoder. The FEC decoder decodes the data stream recovered by the demodulating means in order to provide the auxiliary information.

In an embodiment where the encoder uses a subband analyzer and subband filter to provide the spectral shaping, the decoder will include corresponding elements. In particular, a subband analyzer will be coupled to receive and estimate the spectrum of the output signal. A subband filter will be provided to process the output signal to whiten the carrier portion in response to the spectrum estimated by the subband analyzer. In a more specific embodiment, the subband analyzer used at the decoder can comprise an FFT processor. The subband filter at the decoder can comprise an FFT processor having an output multiplied to form a product with the output of the subband analyzer, together with an inverse FFT processor that receives the product of the other FFT processor outputs.

A decoder is provided for recovering auxiliary information carried by a spread spectrum signal that is hidden as colored noise in a primary data signal. The spread spectrum signal includes a carrier having a spectral shape that simulates the spectral shape of the primary data signal. Means are provided for determining the spectral shape of the primary data signal. The carrier is processed based on the spectral shape determined by the determining means, to whiten the carrier. Means are provided for demodulating the whitened carrier to recover the spread spectrum signal. The recovered spread spectrum signal is despread, and then demodulated to recover the auxiliary information. The whitening of the carrier can be accomplished using linear predictive coding (LPC) techniques.

The decoder can be designed to recover a desired one of a plurality of auxiliary information signals carried on respective carriers of the spread spectrum signal. All of the carriers will be spectrally shaped to simulate the spectral shape of the primary data signal. The demodulator means at the decoder will include means for selecting a desired one of the carriers for demodulation to enable the recovery of a corresponding one of the auxiliary information signals. For each information signals a separate demodulator (and FEC decoder, if necessary) is provided. The components for removing the spectral shaping (i.e., the "whitening circuitry") can be shared by all of the auxiliary information signals at the decoder.

The invention also provides a decoder that is implemented using a rake receiver. Such a decoder is particularly useful for decoding signals received from a basic white noise spread spectrum encoder, i.e., an encoder that provides auxiliary information in a primary data signal as white (uncolored) noise. Whitening means in the decoder create intersymbol interference in the spread spectrum signal. A rake receiver receives the primary data signal from the whitening means. The rake receiver demodulates the received primary data signal to recover the spread spectrum signal with reduced intersymbol interference. The recovered spread spectrum signal is despread to recover the auxiliary information.

The whitening means in the rake receiver embodiment can comprise an LPC processor coupled to receive the primary data signal and generate LPC coefficients therefrom. An LPC filter of order N is provided for receiving the primary data signal. The LPC filter is responsive to the LPC coefficients for whitening the spectrum of the primary data signal. The rake receiver comprises N taps or "fingers", where N is approximately equal to the order of the LPC filter. Each finger processes a different multipath of the spread spectrum signal when demodulating the received primary data signal, thereby recovering the spread spectrum signal with reduced intersymbol interference in order to obtain the auxiliary information therefrom. In this embodiment, the rake receiver can further comprise means responsive to the LPC coefficients for dynamically changing the weights of the rake receiver taps.

DETAILED DESCRIPTION OF THE INVENTION

Figure 1:
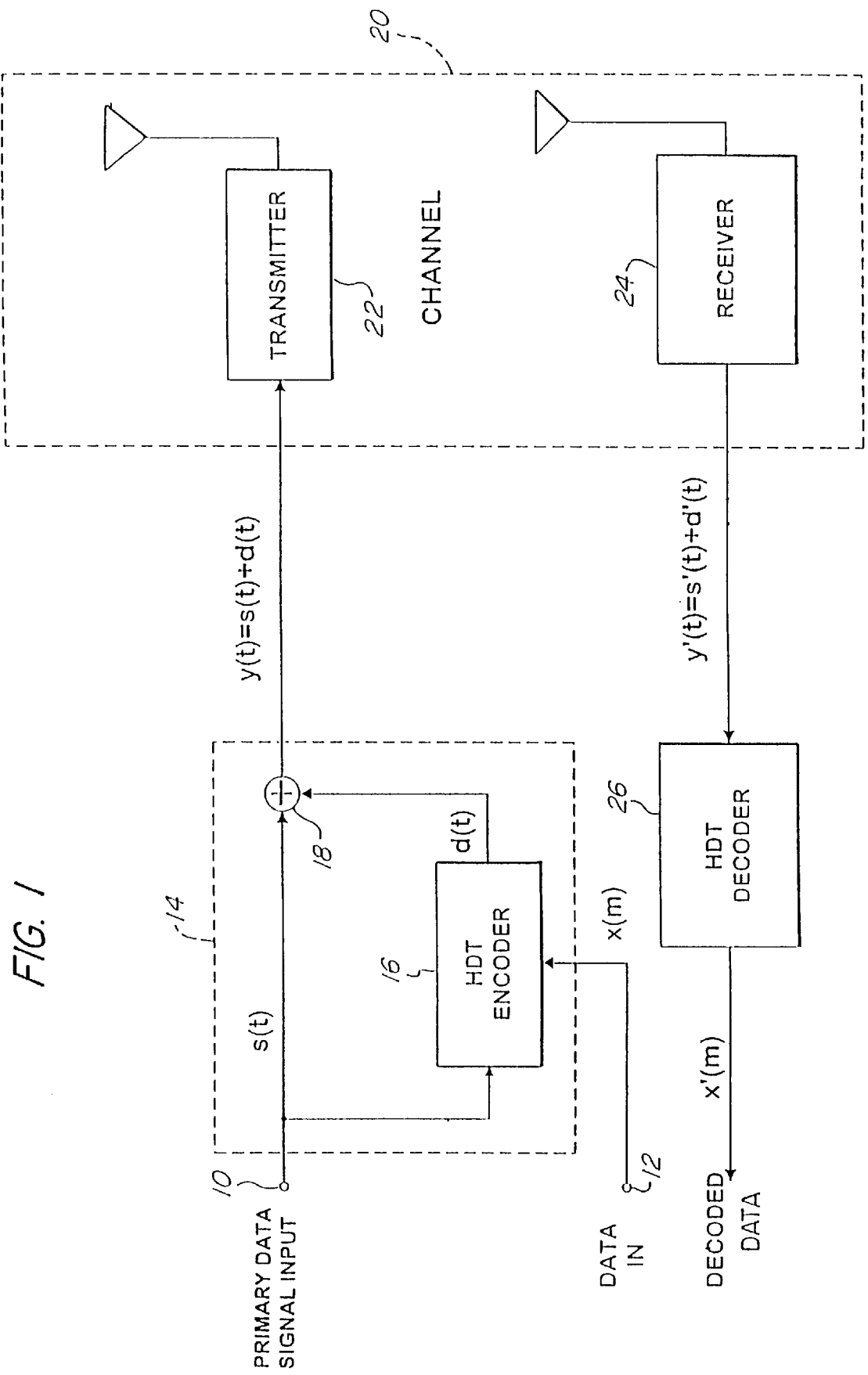
FIG. 1 is a high-level block diagram of the hidden data transport system of the present invention.

The present invention creates a hidden channel within a physical channel designed to carry a primary data signal without interfering unacceptably with the primary data signal. The subsequent modulation of the primary data signal for transmission is relatively irrelevant. Well known AM, FM, and multilevel modulation techniques such as binary phase-shift keying (BPSK), quadrature phase-shift keying (QPSK), quadrature amplitude modulation (QAM), and other known modulation techniques can be used to transmit the primary data signal after it has been processed in accordance with the present invention to carry hidden auxiliary information.

The auxiliary information can comprise any desired data which may or may not have a relationship with the primary data signal. For example, text data, control data, and other unrelated data can be carried in a primary data signal. In addition, or alternatively, data identifying the primary data signal and/or its content; market research and commercial verification data, as well as copy protection data can be carried using the techniques of the present invention.

It should be appreciated that the present invention is not limited in any way as to the type of data that can be hidden or otherwise carried in the primary data signal, nor is the invention limited to the type of primary data signal used. That is, the primary data signal may include an electromagnetic signal having frequency components which are below, in, and/or above the audible range. The invention may also be extended for use with acoustic waves.

The best kind of signal to use as the carrier for the auxiliary information to be hidden is a random noise-like signal. Random noise is easier to tolerate than correlated noise.

Pseudorandom noise is typically used in a spread spectrum communication system. Such a system is used in accordance with the present invention in order to reliably transmit data at a desired signal to noise ratio (SNR) of, for example, −40 dB. A high processing gain, i.e. ratio between signal bandwidth and signalling rate, is needed to overcome a low SNR. Therefore, in a typical spread spectrum system the information rate is very low, typically over 100 bits per second over a 6 MHz bandwidth video channel. A pseudorandom (PN) carrier used in a spread spectrum system has a side band spectrum. Thus the required SNR is difficult to maintain at the spectral valleys unless the processing gain is much higher. In order to overcome this problem, the present invention adoptively shapes the PN spectrum to match that of the spectrum of the primary data signal. This technique enables auxiliary information to be hidden in a primary data signal at reasonably high data rates.

Adaptive shaping of the PN spectrum in accordance with the present invention to generate a "colored noise" carrier signal can be achieved, for example, by passing white PN noise through a linear predictive coding (LPC) filter that is derived from the primary data signal in which data is to be hidden. The PN noise sequence serves as the carrier signal that is shaped by an LPC filter to dynamically match the spectrum of the primary data signal. Advantageously, the nearly perfect inverse LPC filter can be computed at a receiver since the injected noise signal itself will have a similar spectral shape as the primary data signal.

A benefit of employing an LPC filter is the flattening or "whitening" effect of the interfering signal, in this case the primary data signal. The linear prediction process removes the predictable part of the signal such that the prediction residual has a relatively flat spectrum. This type of noise significantly improves the performance of forward error correction (FEC) coding that will typically be provided for the auxiliary information in order to reduce the probability of errors at the receiver.

Another benefit of an LPC embodiment is that transmission channel distortion can also be compensated for by the LPC filter through the whitening process. In effect, the inverse LPC filter at the receiver acts as an automatic equalizer for the combined filter formed by the transmit LPC filter and the channel filter. A further benefit of LPC is that it provides a prediction gain useful for example, in reducing the power of the primary data signal.

Alternative embodiments are disclosed in which subband coding is used instead of the time domain modelling and synthesis provided by LPC. In order to implement the invention using subband coding, fast Fourier transform (FFT) techniques can be used.

FIG. 1 illustrates the hidden data transport (HDT) system of the present invention in simplified form. A primary data signal is input via terminal 10 to an encoder 14 that includes an HDT encoder 16 and a summing circuit 18. The HDT encoder 16 receives via terminal 12 auxiliary data that is to be hidden in the primary data signal.

The primary data signal s(t) is analyzed by the HDT encoder 16 to determine the spectral shaping requirement. The auxiliary data x(m) input via terminal 12 is modulated to produce a colored noise signal d(t) which is then added to the primary data signal s(t) in summer 18 before transmission. The signal power of d(t) is adjusted to be a small fraction of the power in s(t). The combined signal y(t)=s(t)+d(t) is transmitted via a transmitter 22 over a channel generally designated 20. The transmitter may modulate s(t) onto a carrier such as a sine wave. Moreover, although a wireless channel is illustrated in FIG. 1, it should be appreciated that a wired channel (e.g., electrically conductive cable or fiber optic cable) can also be used. The invention is also applicable to recorded electromagnetic signals (e.g., on magnetic or optical media or the like, such as tapes and compact discs and the like).

A receiver 24 produces a replica of the transmitted signal, denoted y'(t)=s'(t)+d'(t). The receiver may include a demodulator if s(t) was modulator onto a carrier at a transmitter. Since the primary data signal s'(t) masks the auxiliary data, the auxiliary data d'(t) is hidden and does not interfere with the primary data signal. For example, if the primary data signal includes audio components, users listening to the signal will hear normal audio s'(t) and will not perceive the presence of d'(t). For non-audio components in the primary data signal, a threshold level of acceptable interference may be determined for the specific application and defined by a signal-to-noise ratio, for example. This threshold level may be determined based on qualitative and/or quantitative criteria. For example, for a satellite transmission, an acceptable interference level may be measured according to a signal acquisition time or error rate. For an analog television transmission, an acceptable interference level may be measured according to the video image quality. HDT decoder 26 will recover the auxiliary digital signal x(m) as x'(m) from the received signal y'(t).

Transmitter 22, receiver 24 and the propagation medium through which they communicate are collectively referred to as the channel 20. This channel can be virtually anything capable of carrying a primary data signal, using any form of analog or digital transmission. Further, the transmission may be in a compressed or uncompressed format. Examples are AM or FM broadcasting, satellite transmission, cellular phone and other mobile radio transmissions, cable television, cassette tape, compact disc, the Internet, computer networks, telephone networks and the like.

Figure 2:
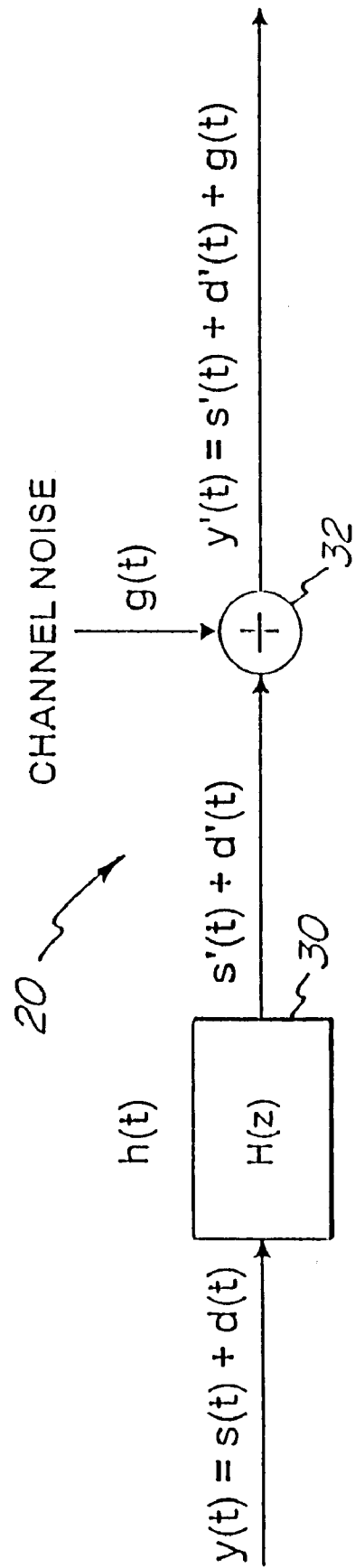
FIG. 2 is a block diagram illustrating a model of a typical transmission channel.

FIG. 2 is a model of the transmission channel 20. The channel is simply modeled in this example by a linear channel filter 30 (H(z)), with an additive noise g(t) referred to as "channel noise." In the illustrative embodiment of FIG. 2, the channel noise is added to the output of the linear channel filter 30 via an adder 32. It will be appreciated that the channel may be non-linear.

The channel filter H(z) is expected to have a nominal low pass characteristic with a sufficiently wide bandwidth to pass the primary data signal with a good quality. The output of the transmission channel is y'(t)=s'(t)+d'(t)+g'(t). The components s'(t) and d'(t) are the responses of the channel to the input s(t) and d(t), respectively.

Figure 3:
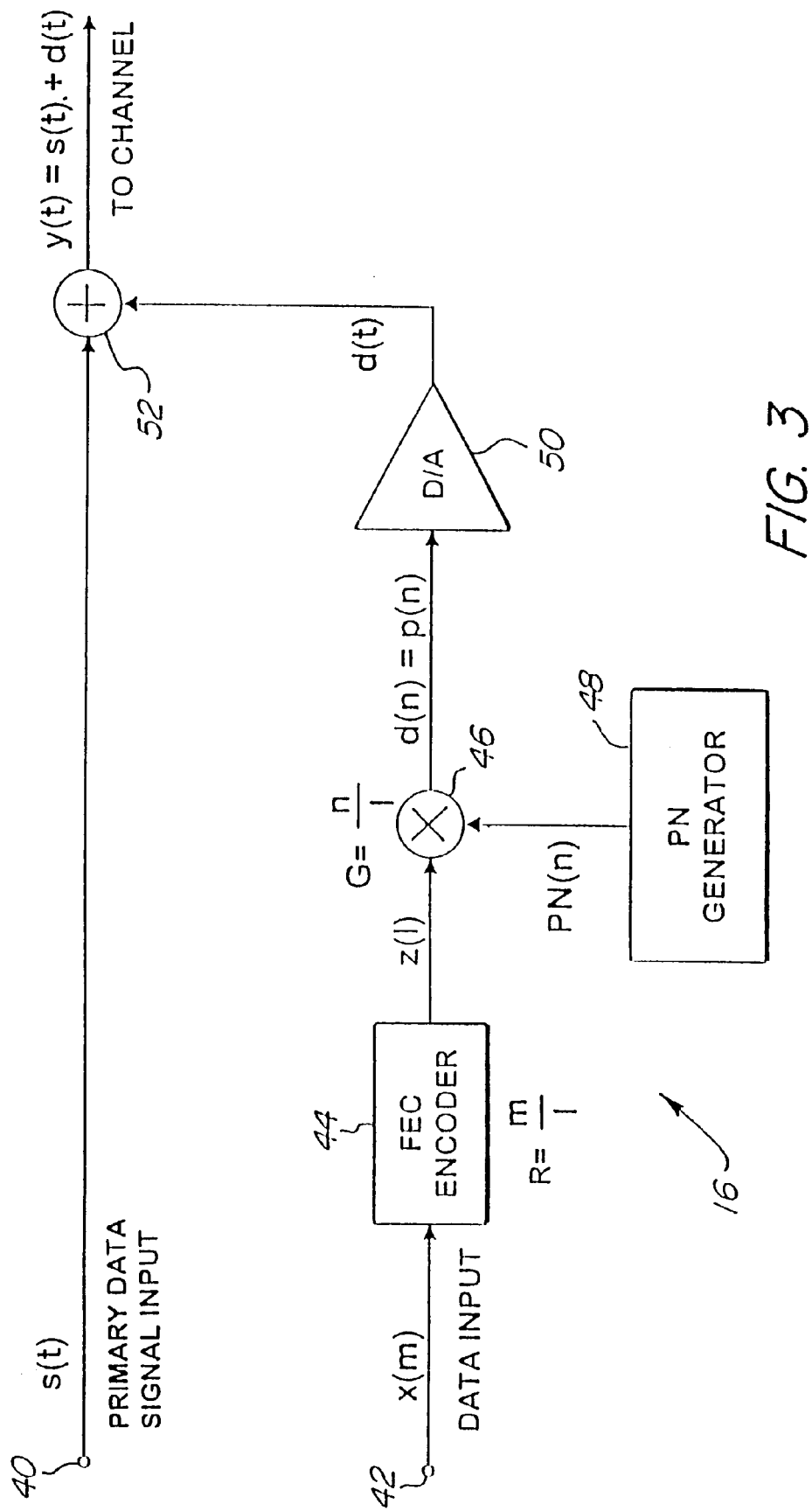
FIG. 3 is a block diagram of a basic white noise hidden data transport encoder.

FIG. 3 illustrates a basic white noise HDT encoder that allows auxiliary information to be carried on a primary data signal as uncolored noise (i.e., without spectral shaping of the spread spectrum carrier). The use of uncolored noise to carry the auxiliary information provides a lower performance than can be obtained using colored noise, as described in more detail below in connection with FIGS. 5(a) and 6. However, a basic encoder as illustrated in FIG. 3 provides a simple and straightforward implementation.

The encoder 16 of FIG. 3 receives the primary data signal input s(t) via terminal 40. This input is added to the auxiliary information, which is in the form of a spread spectrum signal, via a summing circuit 52. It should be appreciated that the primary data signal input can be combined with the spread spectrum signal carrying the auxiliary information using any known signal combining circuit.

The auxiliary information to be transported with the primary data signal is input via terminal 42 to a forward error correcting (FEC) encoder 44. Such FEC encoders are well known in the art. The FEC encoded data is then multiplied with a pseudorandom noise sequence output from a conventional pseudorandom sequence generator 48 via a multiplier 46. The PN generator 48 can be based, for example, on a feedback shift register circuit or other well known key and generator circuit. The output of the generator PN(n) may, for example, take on values of either +1 or −1. In this example, the long-term power spectrum of PN(n) is flat (i.e., "white"), although the present invention may be adapted for use when PN(n) is not flat.

The output of multiplier 46 is a modulated PN sequence p(n). Normally, the sampling rate or "chip rate" of PN(n) is much higher than the symbol rate of the output z(l) of FEC encoder 44. Thus, G>>1, where G=n/l is the processing gain ("spreading ratio"). The signal processing from x(m) to p(n) illustrated in FIG. 3 comprises conventional direct sequence spread spectrum modulation.

Figure 4:
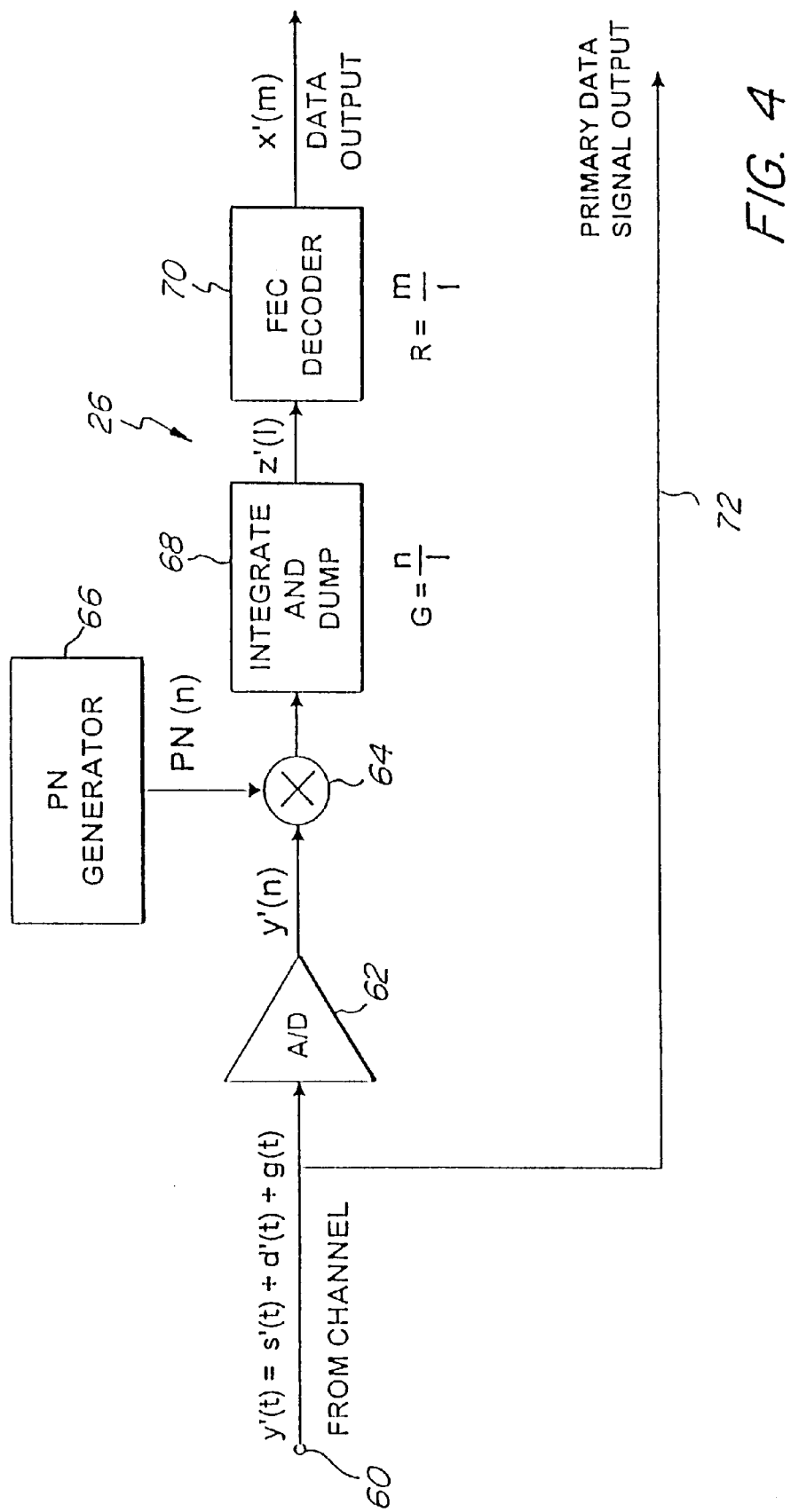
FIG. 4 is a block diagram of a basic white noise hidden data transport decoder.

The modulated PN sequence p(n) is input to a digital-to-analog (D/A) converter 50, that converts the signal to its analog form d(t) for combination with the primary data signal, which is then communicated over a channel to the encoder of FIG. 4.

FIG. 4 illustrates a decoder wherein the primary data signal carrying the auxiliary information is input via a terminal 60 to an analog-to-digital (A/D) converter 62. The primary data signal is also directly output via line 72 to conventional processing circuitry which may include a demodulator, filter, amplifier, and the like (not shown). The noise containing the auxiliary information is at a level in the output primary data signal which is low enough to avoid interfering with the primary data signal. Thus, the auxiliary information is "hidden" in the primary data signal, it is there, but it will not interfere with conventional processing of the primary data signal. For instance, if the primary data signal includes audio components, these components may be provided at a substantially inaudible level.

An analog-to-digital (A/D) converter 62 converts the input signal to the digital domain for combination in multiplier 64 with the same pseudorandom sequence PN(n) used at the encoder. The pseudorandom sequence is provided by a PN sequence generator 66 which is identical to the PN sequence generator 48 found at the encoder. The multiplication performed by circuit 64 demodulates the spread spectrum signal, which is then despread in a conventional manner by integration and dumping circuit 68. The despread output z'(l) comprises the FEC encoded auxiliary information. This information is decoded by FEC decoder 70 to output the recovered auxiliary information x'(m).

The amount of noise that can be added to the primary data signal without exceeding an interference threshold can be increased by using a colored noise signal instead of the white noise signal provided by the encoder of FIG. 3.

Figure 5A:
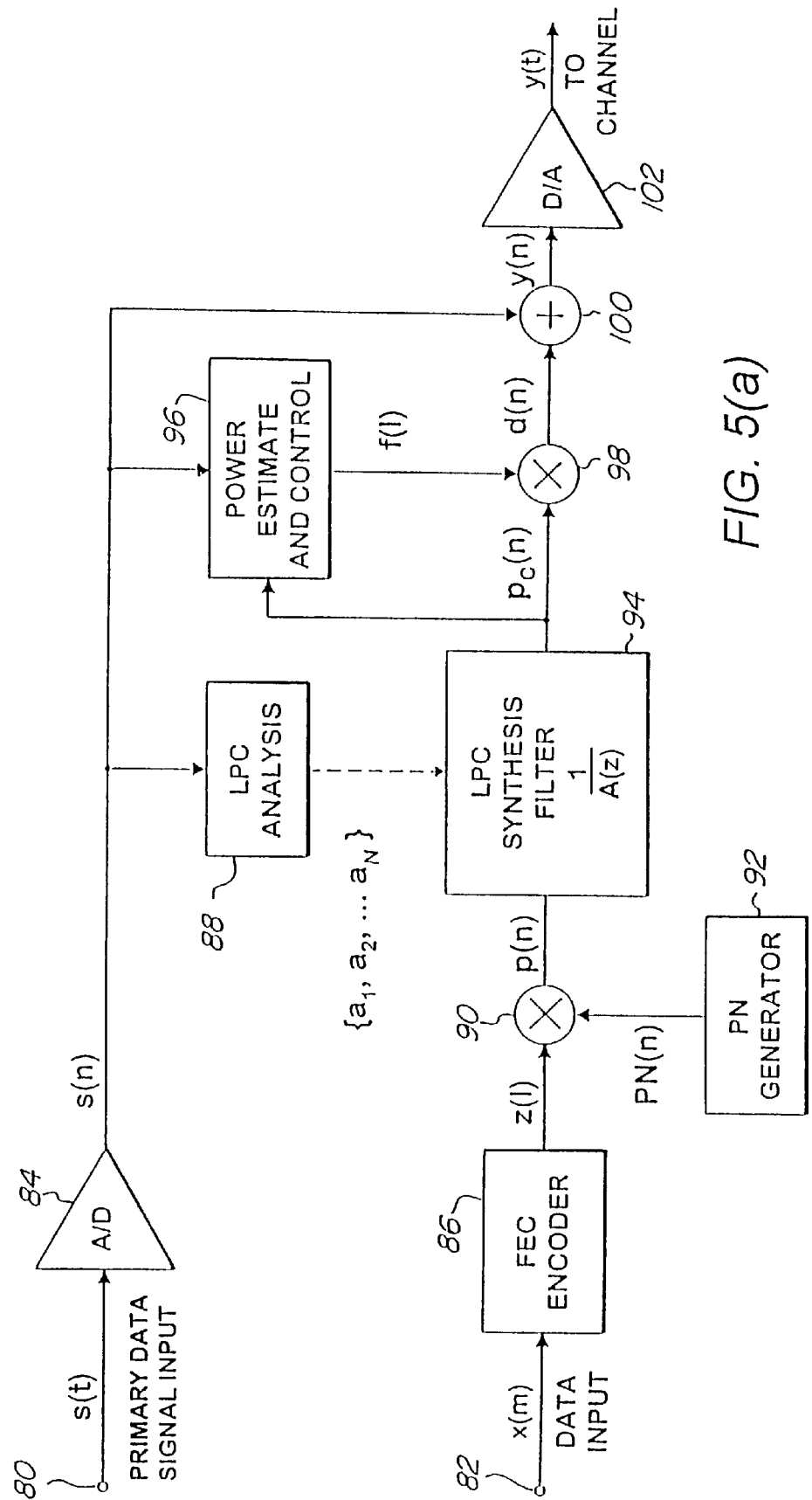
FIG. 5(a) is a block diagram of an LPC embodiment of a hidden data transport encoder providing spectral shaping and power adjustment of the auxiliary information to be hidden in the primary data signal.
Figure 5B:
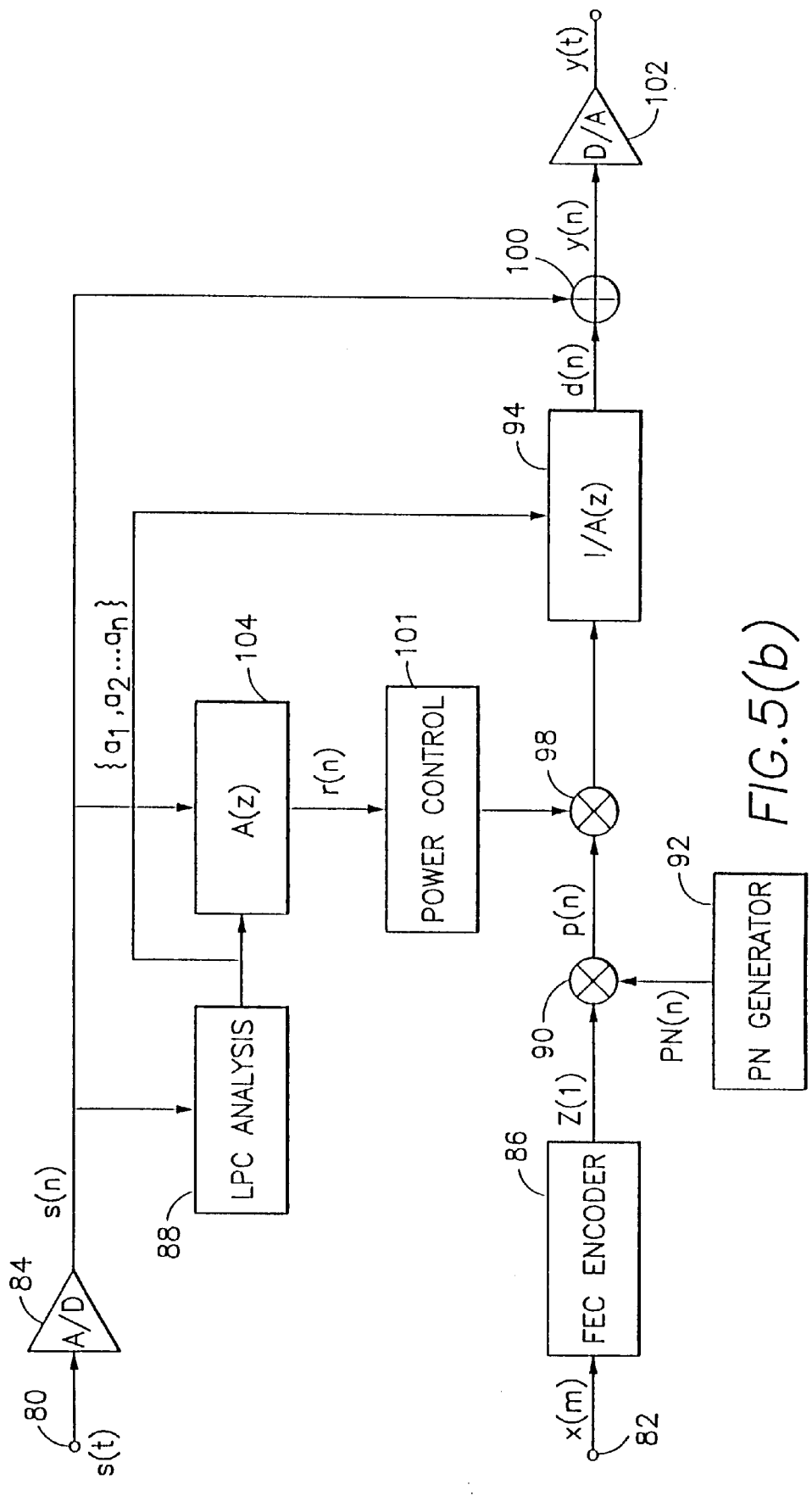
FIG. 5(b) is a block diagram of another embodiment of an LPC hidden data transport encoder providing spectral shaping and power adjustment of the auxiliary information to be hidden in the primary data signal.
Figure 6:
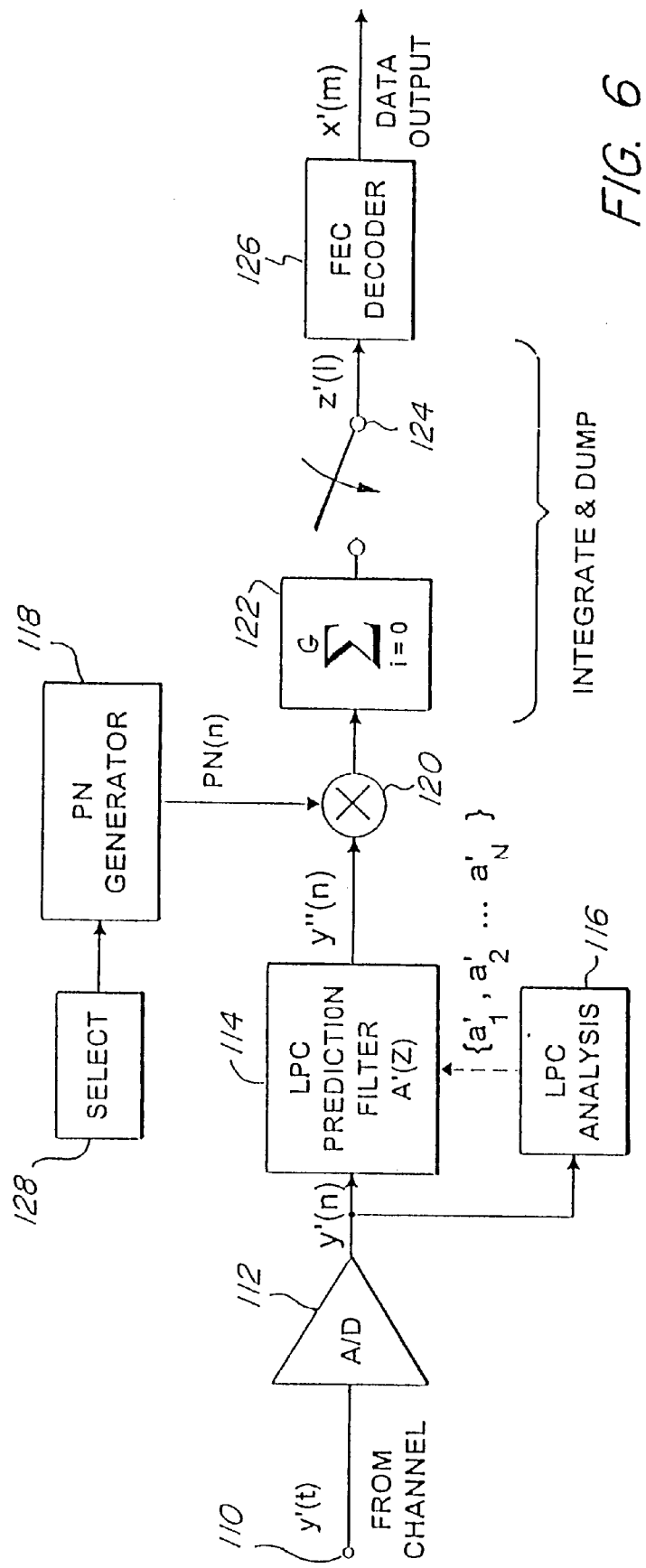
FIG. 6 is a block diagram of a decoder for recovering the hidden information output by the encoder of FIG. 5(a) or FIG. 5(b)

FIG. 5(a) shows an example of a colored noise HDT encoder in accordance with the present invention. The implementation illustrated analyzes the primary data signal information in the digital domain to determine its spectrum, colors the auxiliary data with the same spectrum, and combines the audio data with the colored auxiliary data digitally before the combined signal is converted back to the analog domain. It should be appreciated, however, that this implementation is merely an example of a preferred embodiment. The processing can be accomplished in either the digital or analog domain, and the signals can be transported as digital or analog signals depending on the particular requirements of the system using the invention. Thus, the provision of analog to digital and digital to analog converters in FIGS. 5(a), 5(b) and 6 is not meant to suggest that the processing in accordance with the present invention must take place as shown.

The primary data signal is input to the encoder of FIG. 5(a) via terminal 80. An A/D converter 84 converts the analog primary data signal to a digital form s(n). The auxiliary data to be transported with the primary data signal x(m) is input to an FEC encoder 86 via terminal 82. The FEC coding is used to ensure the integrity of the data, and generates coded symbol z(l). The ratio between the number of information bits and the number of symbols is R=m/l. The term m represents the sampling rate for x(m).

PN sequence generator 92 supplies the PN carrier PN(n) which, for examples can take on values of either +1 or −1. This provides a white long-term power spectrum PN(n) is multiplied with z(l) in a multiplier 90 to generate the modulated PN sequence p(n).

The flat spectrum of the PN modulated signal p(n) undergoes spectral shaping in an LPC synthesis filter 94. The spectral shaping is applied by passing the PN modulated signal through filter 94 having the response 1/A(z), where $$A(z)=1-(a_1z^{-1}+a_2z^{-2}+\ldots+a_Nz^{-N})$$

and the $a_i$'s are the coefficients of an Nth order LPC filter.

The coefficients of the LPC filter used for the spectral shaping conform to coefficients derived from the primary data signal by an LPC analysis circuit 88. The LPC analysis can employ any of the known methods for analyzing a signal spectrum, such as Durbin's recursion discussed by L. Rabiner and R. Schafer, *Digital Processing of Speech Signals,* Prentice-Hall 1978, Chapter 8.3.2, pp. 411–413.

The order N for the LPC analysis is made as large as necessary to accurately model the spectrum of the primary data signal. For example, an order of between about 5 and 50 should be adequate for the LPC analysis. As will be appreciated by those skilled in the art, the order N may depend on the bandwidth of the signal. Thus, for example, for typical telephone bandwidths N may be selected in a range of from about 5 to about 20. The LPC filter coefficients are updated as often as necessary to track the frequency and amplitude variations of the primary data signal.

The output of LPC synthesis filter 94 is a modulated colored noise sequence $p_c(n)$. The noise power is adjusted via a power estimating and control circuit 96 and multiplier 98 to a desired level. For example, where it is desired to have the auxiliary information carried on the primary data signal with a specific noise power, the noise power is adjusted to fall below the specified level.

In other applications, it may be desired to set the noise power above an interference threshold level which does not interfere with the primary data signal. For example, in a copy protection scheme for digital audio tapes (DAT), it may be desired to add a noise signal to the digital audio in the primary data signal each time a copy is made. After a given number of copies, the cumulative noise will audibly degrade the quality of the recording. Alternatively, it may be desired to introduce a predetermined amount of interference to a primary data signal. In this case, the power estimation and control circuitry 96 will be adjusted to introduce the desired amount of noise (which may be above the interference threshold) to the primary data signal.

For each pseudorandom frame output from the filter 94, the average power in the primary data signal s(n) and the average power in $p_c(n)$ are measured by the power estimate and control circuit 96. Proper scaling f(l) is applied to $p_c(n)$ via multiplier 98 to maintain the output signal power d(n) at the desired power level, such as below an interference threshold. To render the auxiliary information below an interference threshold, the ratio of the auxiliary information to the primary data signal information is typically 1:1,000 in power (−30 dB) in an audio application. The power adjusted colored PN noise signal d(n) is added to the primary data signal s(n) via adder 100 to produce a combined output signal y(n). The output signal y(n) can be converted to an analog signal y(t) via a digital-to-analog converter 102, for transmission in place of the primary data signal s(t).

FIG. 5(b) shows another example of a colored noise HDT encoder in accordance with the present invention. The encoder is particularly adapted for use with a primary audio signal. Here, p(n) is power-adjusted before being spectrally shaped. The LPC analysis circuit 88 provides coefficients $\{a_1, \ldots, a_n\}$ to a filter 104 and the LPC synthesis filter 94. The LPC prediction filter 104 implements the transform function A(z) which is essentially the inverse of the spectrum of s(n). The filtered primary data signal input (designated r(n)), which has the transfer function S(z)A(z), where S(z) is the z-transform of s(n), is then provided to a power control function 101.

Figure 5C:
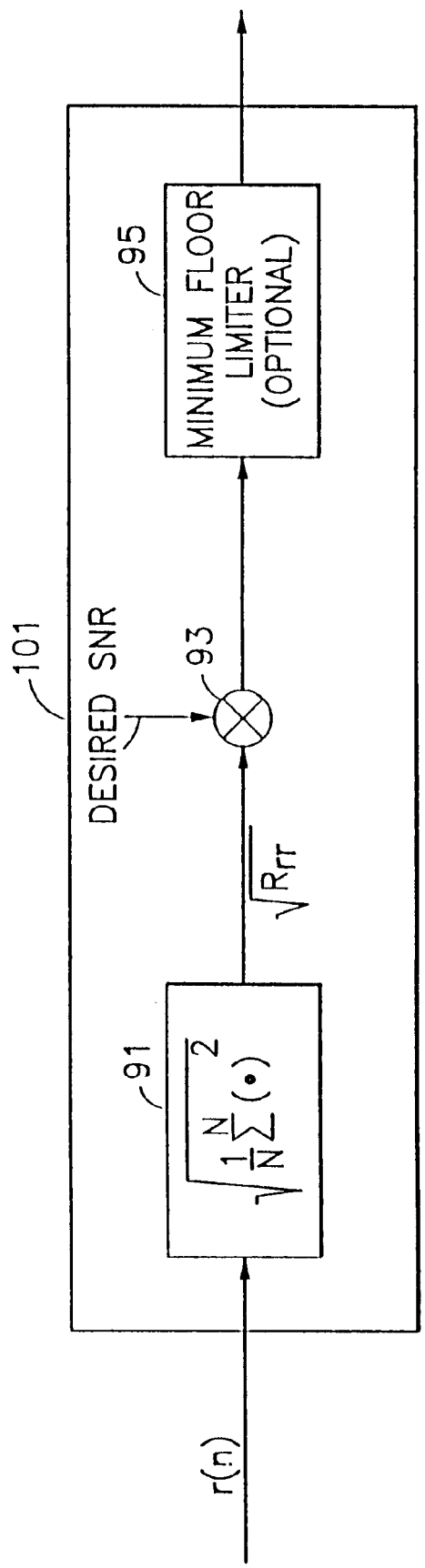
FIG. 5(c) is a block diagram of a power control function for use with the encoder of FIG. 5(b)

FIG. 5(c) is a block diagram of a power control function for use with the encoder of FIG. 5(b). The power control function 101 includes an average amplitude estimation function 91, a multiplier 93, and a limiter 95. The average amplitude estimation function 91 receives the filtered primary data signal input r(n) and estimates the average amplitude, in particular, by determining the root mean square of the amplitude of the filtered primary data signal input according to the following expression where the (•) is the amplitude of the filtered primary data signal input:

$$\left[\frac{1}{N}\sum_{i=1}^{N}(\bullet)^2\right]^{\frac{1}{2}}$$

The estimated average amplitude is then multiplied by a signal-to-noise ratio (SNR) value at multiplier 93 to provide an amplitude adjustment signal. The SNR is a desired ratio of the auxiliary information to the primary data signal information, and may be, for example, 1:1,000 in power (e.g., −30 dB). The amplitude adjustment signal is provided to an optional limiter function 95 which limits the adjustment signal to a minimum floor value.

By limiting the adjustment signal to a minimum, non-zero, floor level, it is possible to encode HDT data through silent portions of a primary audio data signal. For example, a musical passage may have silent intervals, or a compact disc or the like may have silent intervals between tracks. The amplitude adjustment signal may be used to provide the embedded data at an amplitude corresponding, for example, to one least significant bit out of sixteen bits which may be used to code the primary data signal. Thus, the amplitude of the embedded data will be equal to a quantization error. Moreover, the spectrum of the embedded data will be substantially flat and there will be no need for spectral shaping at the LPC synthesis filter 94.

Referring again to FIG. 5(b), the floor-limited amplitude adjustment signal is combined with the auxiliary data signal p(n) at a multiplier 98 to provide a power-adjusted auxiliary data signal, which is then provided to the LPC synthesis filter 94 for spectral shaping in accordance with the LPC coefficients $\{a_1, \ldots, a_n\}$.

Finally, the power adjusted and spectrally shaped (e.g., colored) PN noise signal d(n) is added to the primary data signal s(n) via adder 100 to produce the combined output signal y(n). The output signal y(n) may be further processed by the D/A converter 102 as discussed.

Advantageously, the embodiment of FIG. 5(b) is matched to the processing performed at a decoder of the present invention. Moreover, by performing the power adjustment prior to spectral shaping, the auxiliary data signal will be smoother since transitions between frames of data samples will be reduced. This is true since spectral shaping by itself increases power level differences between adjacent frames (e.g., each containing 512 data samples) of auxiliary data samples.

A hypothetical, but practical audio design example implementing the encoder of FIG. 5(a) or FIG. 5(b) can utilize an input data rate of 7.5 bits per second (m=7.5 Hz) for the auxiliary information input via terminal 82. The FEC encoder rate can be R=½ (l=15 Hz), and the processing gain (spread ratio) may be G=2,000 (33 dB). The pseudorandom sampling rate (chip frequency) is n=30 KHz. The LPC prediction order is N=10. It is assumed that the channel has at least 15 KHz of bandwidth with minor frequency distortions.

In the design example, the encoder uses binary phase shift keying (BPSK). In this example implementation, x(m), z(l), PN(n), and p(n) are binary signals, x(m)={0, 1}, z(l)={−1, +1}, PN(n)={−1, +1}, and p(n)=({−1, +1}. The FEC encoder generates two samples of z(l) for every input sample of x(m). They may not be adjacent samples since an interleaver may be employed inside the FEC encoder. A PN frame is defined as a group of 2,000 PN chips (samples) of PN(n). For each sample of z(l), 2,000 chips of PN(n) in the PN frame are multiplied with z(l). In other words, the signs of 2000 samples in the PN frame are changed if z(l)=−1. The resulting BPSK modulated PN signal p(n) has a white noise spectrum. The desired spectral shaping is obtained by passing p(n) through 1/A(z) to produce $p_c(n)$.

Although the primary data signal in the above design example is stronger than the noise signal (e.g., by 30 dB), the processing gain is very high. With R=½ and G=2,000, the effective processing gain is 4,000 (36 dB). The available bit energy over noise density (Eb/No) is 3631 30=6 dB, which is very adequate for BPSK signaling.

It should be appreciated that the specific parameters noted in the above example are for purposes of illustration only. Other parameters may be used in a particular implementation, as will be appreciated by those skilled in the art.

FIG. 6 illustrates a decoder for the signals output from the encoder of FIG. 5(a) or FIG. 5(b). The decoder receives y'(t) via terminal 110. In order to undo the spectral shaping applied by the LPC synthesis filter 94 at the encoder and recover p(n), the decoder must have the LPC filter coefficients. However, these coefficients are not necessarily transmitted by the encoder, even though the LPC order N is fixed and known to the decoder. Instead, the decoder may perform its own LPC analysis on the received signal using LPC analyzer 116 to estimate the LPC filter. The coefficients derived from the estimate are input to an LPC prediction filter 114 that is the inverse of the LPC synthesis filter 94 at the encoder. Since s'(t) is the dominant component in the received signal, which is a good replica of s(t), and due to the averaging process embedded in the LPC analysis (providing a wide analysis window), the estimated LPC coefficients $a'_1, a'_2 \ldots, a'_N$ can be very close to the LPC coefficients $a_1, a_2 \ldots, a_N$ used at the encoder.

Once the coefficients for the LPC prediction filter A'(z)= $[1-(a'_1 z^{-1}+a'_2 z^{-2} + \ldots +a'_N z^{-N})]$ are found, the sampled received signal, y' (n), is filtered to produce y"(n)=s"(n)+p'(n)+g'(n). p'(n) is a close replica of p(n) since the combined influence of the LPC synthesis filter 1/A(z) and the channel response H(z) is cancelled by the LPC prediction filter A'(z). Both s"(n) and g'(n) are the prediction residuals when s'(n) and g(n) are filtered by A'(z), respectively. The effect of g'(n) can be largely ignored due to a high processing gain. A'(z) removes much of the redundancy in s'(n) so that s"(n) will have a flat, white spectrum. The power is s"(n) is also lowered by a typically large prediction gain of the LPC filter A'(z). Consequently, s"(n)+g'(n) becomes a white noise interference to p'(n), which itself has a white noise spectrum.

The remaining steps for recovering the auxiliary data from p'(n) are similar to those used by the sequence spread spectrum demodulator of FIG. 4. The same PN sequence synchronized to the PN sequence used at the encoder is multiplied with y"(n) using PN generator 118 and multiplier 120. A select circuit 128 is provided to select a desired PN chip offset and/or the PN sequence itself. The integration and dump circuit comprising summer 122 and switch 124 despreads and recovers z'(l) and integrates out much of the power in s"(n)+g'(n). In the example embodiment illustrated, the correlation property of the PN sequence allows a constructive summation of all 2,000 chips in p(n) to produce z'(l). In this example, switch 124 is switched at a rate of 15 Hz, and z'(l) has an SNR of about 3 dB (2:1), which is high enough for a simple FEC decoder with R=½ to reliably decode x'(m) at 7.5 bps. The signal to noise ratio (signal being z'(l)) is improved by the processing gain G=n/l. Finally, the FEC decoder 126 performs the error correction necessary to produce a reliable estimate of the auxiliary data x'(m).

Figure 7:
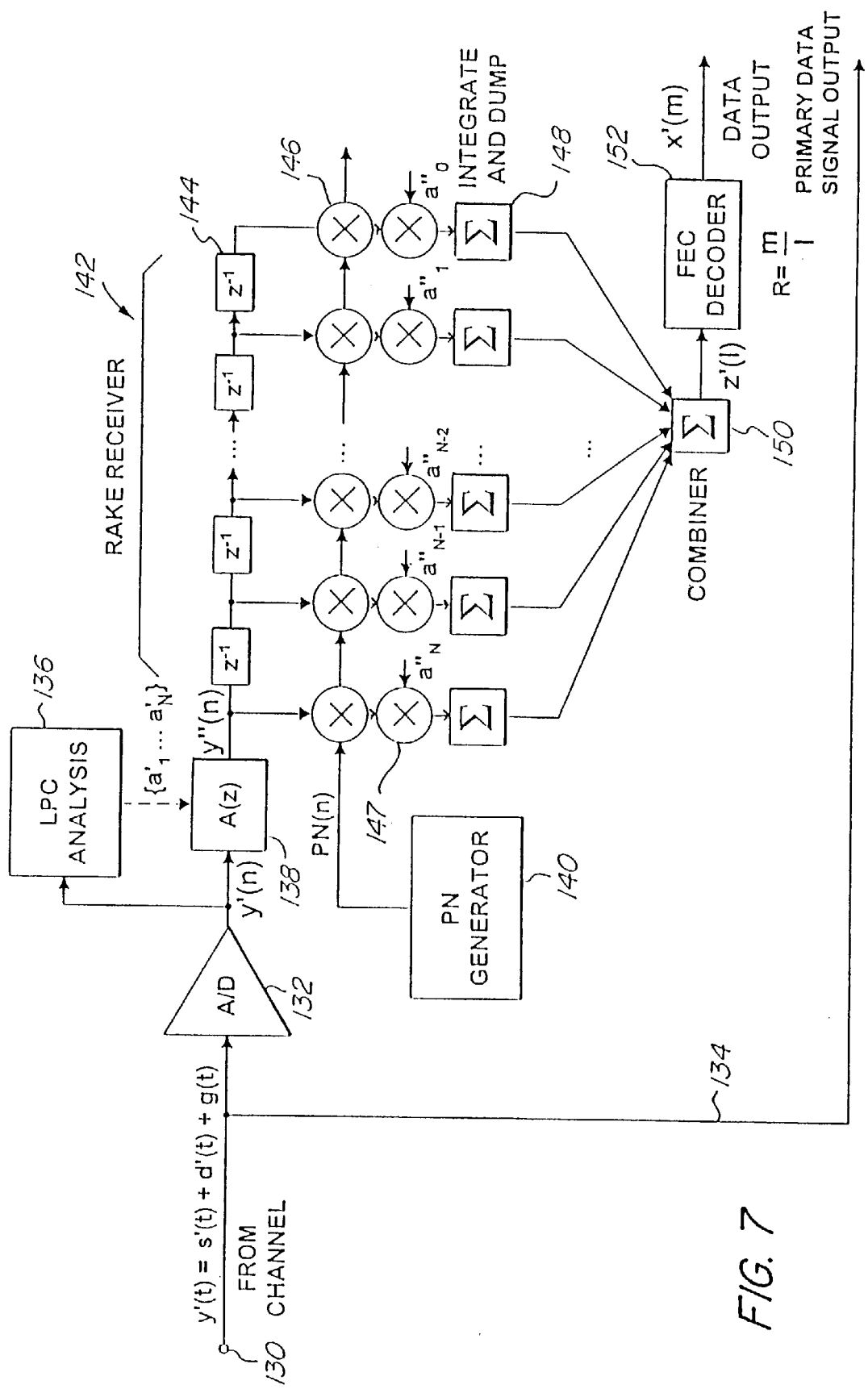
FIG. 7 is a block diagram of a hidden data transport decoder using a rake receiver.

FIG. 7 illustrates an embodiment of a decoder using a rake receiver. This decoder is useful in decoding auxiliary information from a primary data signal produced by a white noise encoder of the type illustrated in FIG. 3. Although an uncolored white noise signal is more audible for a given power level than a colored noise signal with suitable spectral shaping, the performance of white noise signaling (e.g., as provided by the encoder of FIG. 3) can be significantly improved by a combination of an LPC filter and a rake receiver. This is achieved by using a much lower noise power than in the colored noise case, and relying on the LPC prediction gain at the receiver to reduce the interference power of the primary data signal. However, the LPC prediction filter A(z) will shape the noise signal while whitening the spectrum of the primary EM. This intersymbol interference introduced by A(z) is overcome by a rake receiver generally designated 142 in FIG. 7, which treats each coefficient of A(z) as a multipath component.

FIG. 7 illustrates such a decoder that uses an LPC prediction filter comprising LPC analyzer 136 and LPC filter 138 together with rake receiver 142. The number of taps or "fingers" of the rake receiver must approximately match the order of the LPC filter, N. Each finger includes a multiplier 146 that receives the PN(n) sequence from PN generator 140 and a tap weight formed from a multiplier 147 that multiplies the output from the respective multiplier 146 by a respective tap weight.

The illustrated decoder utilizes a simple combining strategy that literally sums all the energy from each finger in a combiner 150. This is accomplished by setting the tap weights to 1, e.g., $a''_0=1, a''_1=1, a''_2=1, \ldots, a''_N=1$. A more optimal combining strategy can be implemented, which dynamically changes the weights on each finger depending on the LPC coefficients. For example, a constant term $a''_0$ can be set to 1, $a''_1$ can be set to equal the LPC coefficient $a'_1$, $a''_2$ can be set to equal LPC coefficient $a'_2$, and so on, where the LPC coefficients $a'_1, a'_2, \ldots, a'_N$ are the coefficients computed locally by LPC analyzer 136.

Prior to combiner 150, the weighted outputs for each finger are integrated and dumped using circuits 148 that correspond to components 122 and 124 of FIG. 6. The output of combiner 150 is decoded in FEC decoder 152, assuming that the original auxiliary information data was FEC encoded. The primary data signal received at terminal 130, which includes the auxiliary information as white noise, is output via line 134 for conventional processing.

Figure 8:
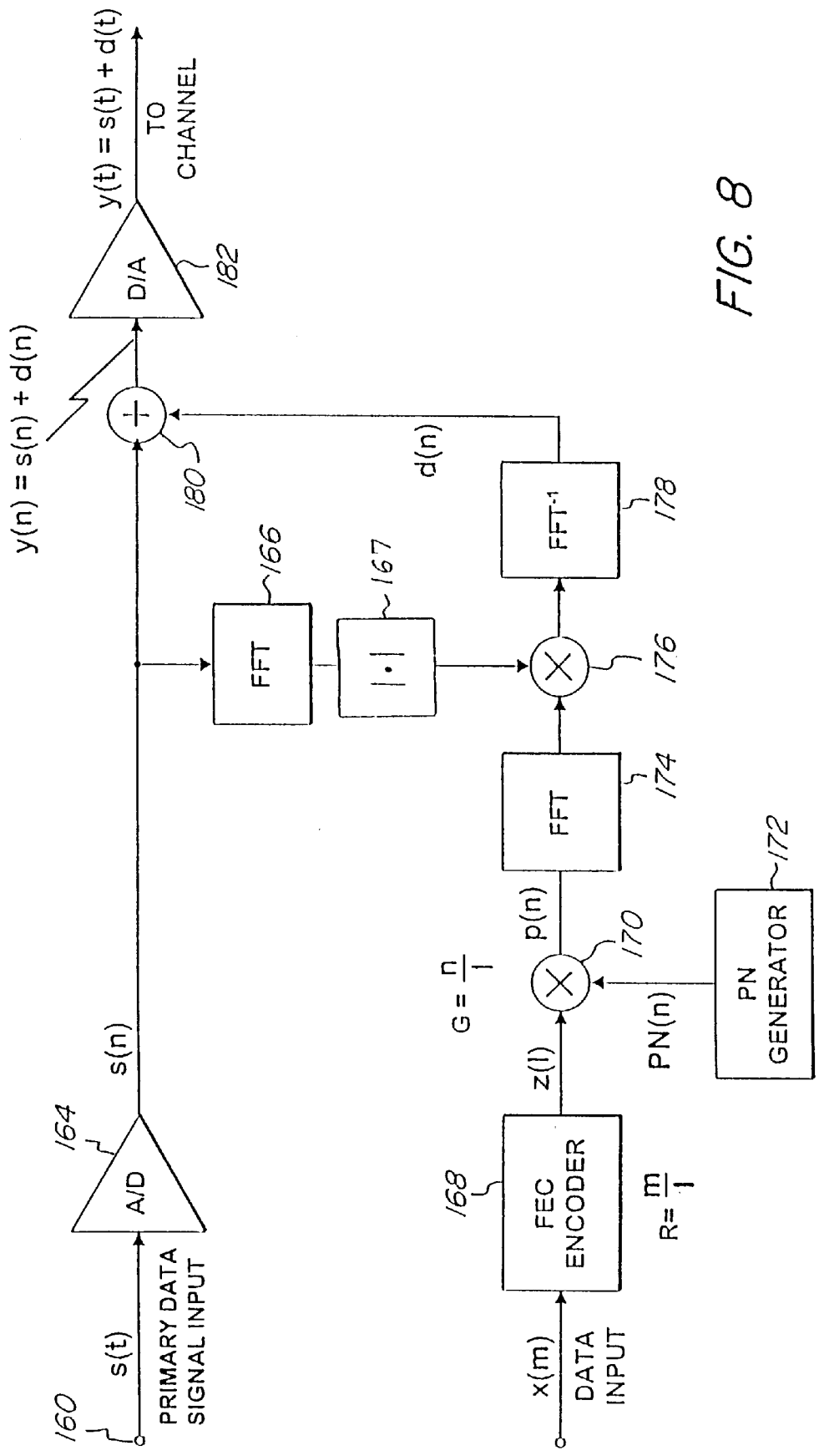
FIG. 8 is a block diagram of a hidden data transport encoder using subband coding, and particularly fast Fourier transform techniques, to spectrally shape the information to be hidden on the primary data signal.

In an alternate colored noise embodiment, the spectral shaping is provided by subband coding techniques instead of linear predictive coding. As used herein, the term subband coding is meant to include transform coding. An example of an encoder using subband coding for spectral shaping is illustrated in FIG. 8. A corresponding decoder is illustrated in FIG. 9.

FIG. 8 illustrates an encoder wherein the LPC filter is replaced by a fast Fourier transform (FFT) operation. Instead of the LPC analysis, an FFT of the primary data signal is computed by FFT 166, and the absolute value is taken at function 167. This provides the spectral shape information of the primary data signal, which can be used to shape the PN noise signal to match that of the primary data signal. The LPC synthesis filter of FIG. 5(*a*) or FIG. 5(*b*) is replaced with an FFT 174, followed by a frequency weighting performed by multiplier 176, followed by an inverse FFT operation performed by inverse FFT processor 178. As in the embodiments of FIG. 5(*a*) and FIG. 5(*b*), the primary data signal is received by a D/A converter 164 via an input terminal 160, the output of which is summed in a summer 180 with the colored noise output from inverse FFT processor 178. The auxiliary information data is input to an FEC encoder 168 via terminal 162. The output of the FEC encoder is combined with a pseudorandom sequence from PN generator 172 in multiplier 170. The primary data signal combined with the colored noise is converted by D/A converter 182 to an analog signal for transmission on a communication channel. As noted in connection with the embodiments described above, the FEC encoder is optional, and the A/D and D/A converters may or may not be necessary, depending on the particular form in which the primary data signal is received and the form in which it is intended to be output.

Figure 9:
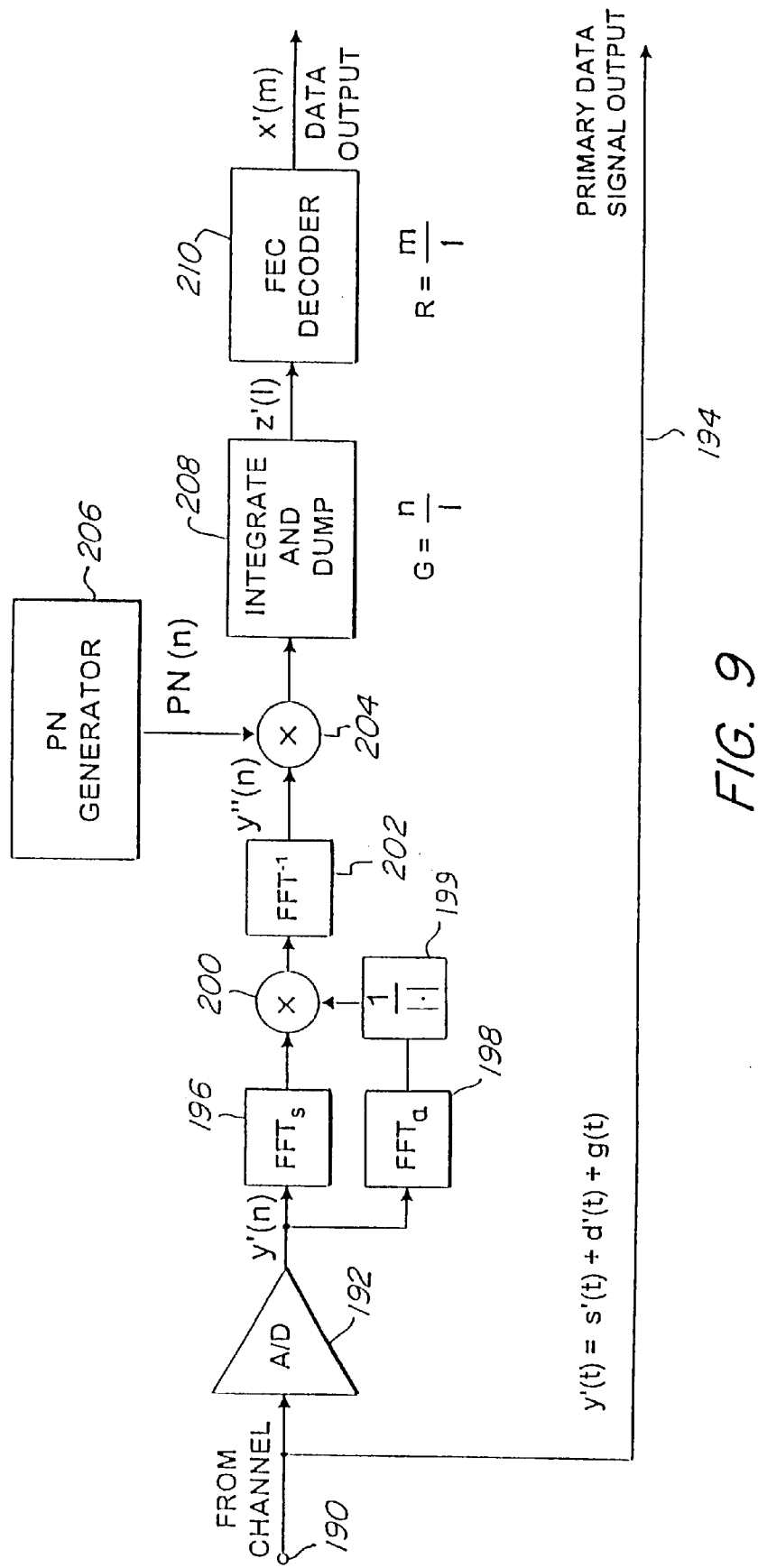
FIG. 9 is a decoder embodiment for use in recovering the information hidden using the encoder of FIG. 8.

FIG. 9 illustrates a decoder which receives the output from the encoder of FIG. 8 via terminal 190. If necessary, A/D converter 192 converts the analog input to a digital signal for processing by a shaping FFT 196 ("FFTs") and an analysis FFT 198 ("FFTa") and inverse absolute value function 199. The outputs of these FFT's are combined by multiplier 200 for input to inverse FFT processor 202. The resultant whitened spread spectrum signal is demodulated using PN generator 206 and multiplier 204, as well as the integrate and dump circuit 208. FEC decoder 210 provides forward error correction decoding if necessary. The received signal which includes the primary data signal and the auxiliary information carried thereon in the form of noise is output via line 194 to conventional processing circuitry.

Note that the length of the analysis FFT 198 must be long enough to reliably estimate the spectrum of the primary data signal. However, the length of the noise shaping FFT 196 does not have to be the same as the analysis FFT. If a shorter length is called for, a finite impulse response (FIR) filter can replace the noise shaping operation without much computational penalty. The FIR filter would have to be dynamically designed from the result of the analysis FFT using any well known filter design technique, such as those disclosed in Oppenheim & Schafer, *Digital Signal Processing*, Chapter 5.6.

The techniques of the present invention can be used to communicate a plurality of different auxiliary information signals on the same primary data signal. One embodiment of an encoder for accomplishing this is illustrated in FIG. 10.

Figure 10:
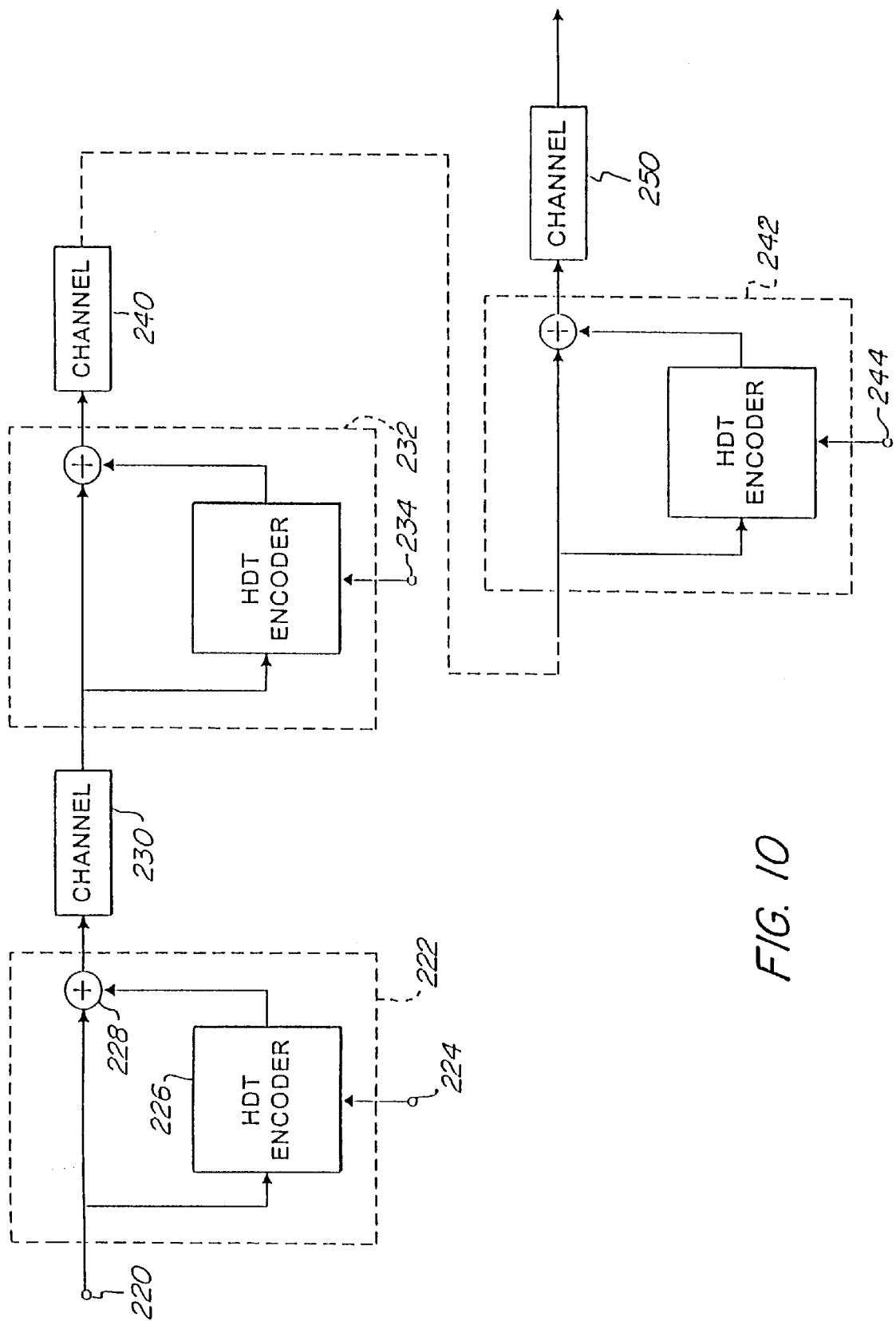
FIG. 10 is a series embodiment for hiding a plurality of auxiliary information signals on a primary data signal.

FIG. 10 shows a "cascaded" embodiment wherein the primary data signal is input via terminal 220. A first encoder 222 includes an HDT encoder 226 that adds a first auxiliary information signal input via terminal 224 to the primary data signal via combiner 228. The output of encoder 222 is communicated over a channel 230 to another encoder 232. This encoder can be identical to encoder 222, and adds a second auxiliary information signal input via terminal 234 to the primary data signal which already contains the first auxiliary information signal. The output of encoder 232 is communicated via channel 240 to a subsequent encoder 242, which can be identical to encoders 222 and 232. Encoder 242 receives a third auxiliary information signal via terminal 244, and adds it to the primary data signal already including the first and second auxiliary information signals. The output of encoder 242 is communicated via channel 250.

Any number of auxiliary information signals can be combined using cascaded encoders as illustrated in FIG. 10. Each HDT encoder 226 can include a power control (such as component 96 illustrated in FIG. 5(*a*)) to individually control the power level at which each auxiliary information signal is added to the primary data signal.

Figure 11:
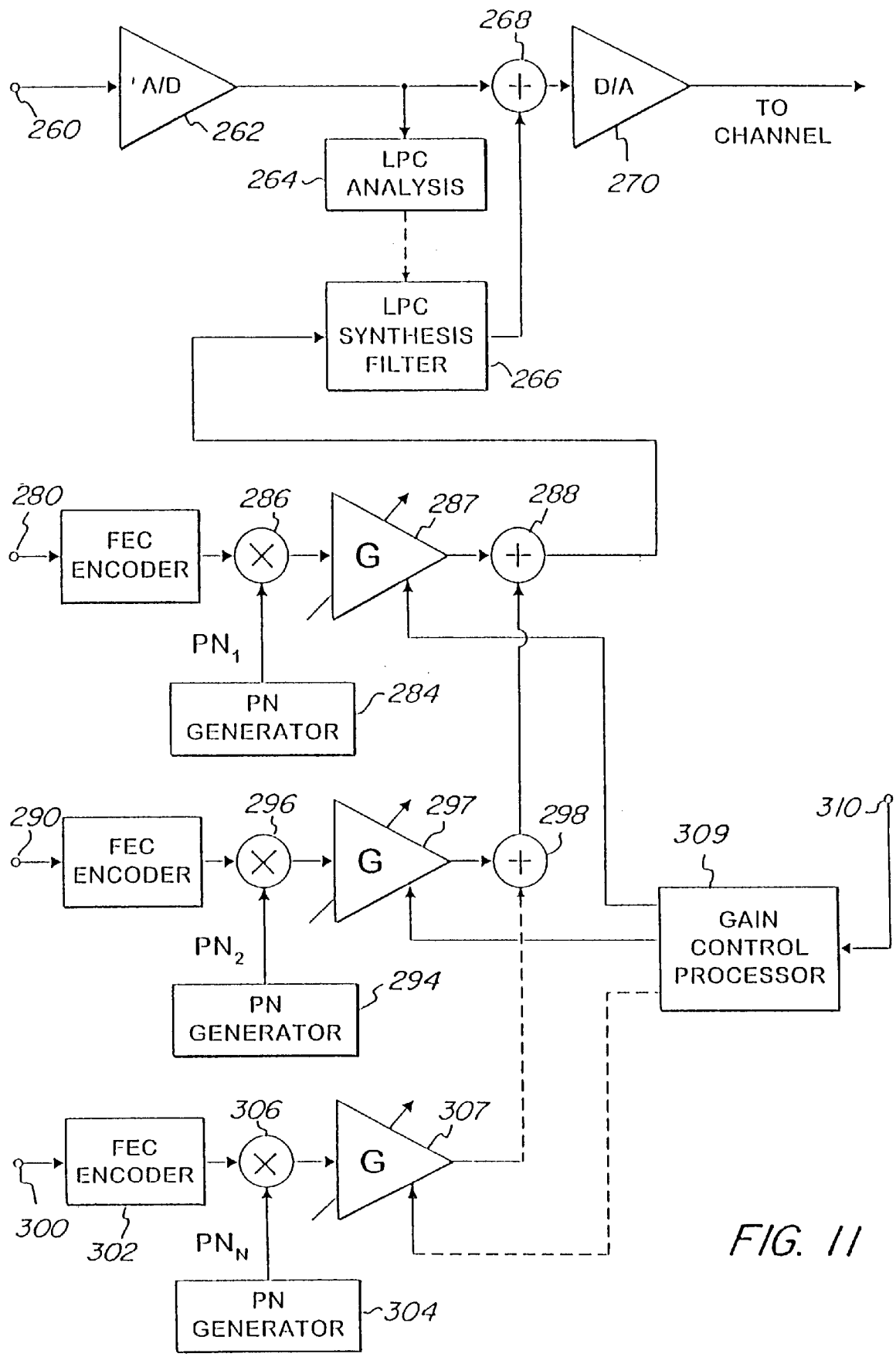
FIG. 11 is a parallel embodiment for hiding a plurality of auxiliary information signals on a primary data signal.

FIG. 11 illustrates an example wherein separate auxiliary information signals are processed to provide corresponding spread spectrum signals, which are combined for spectral shaping as a group. In particular, the primary data signal is input via terminal 260 to an A/D converter 262 (which may not be used depending on the implementation) and its spectrum is analyzed by LPC analyzer 264. A first auxiliary information signal (or group of signals) is input to optional FEC encoder 282 via terminal 280. The signal input via terminal 280 can be an individual stream or a combination of individual streams, and may comprise data and/or synchronization information. It is noted that while each stream will be modulated on a spread spectrum carrier, an unmodulated carrier can also be transported, e.g., as a pilot signal. Such a pilot signal is useful for various synchronization purposes at a decoder, including acquisition and tracking, synchronizing the demodulator, PN sequence synchronization and/or FEC synchronization.

The signal input at terminal 280 is converted to a spread spectrum format using PN generator 284 and multiplier 286. A second auxiliary information signal, which may also comprise a combination of different data streams, is input to optional FEC encoder 292 via terminal 290. This signal is converted to a spread spectrum format by PN generator 294 and multiplier 296. An "Nth" auxiliary information signal (which may comprise a combination of different data streams) is input to optional FEC encoder 302 via terminal 300, and converted to a spread spectrum signal by PN generator 304 and multiplier 306. The second and Nth spread spectrum signals are combined in a combiner 298, and these are combined with the first spread spectrum signal in combiner 288.

The PN generators 284, 294 and 304 can all operate at the same or different rates. For example, if the data input to terminals 280, 290 and 300 is provided at different rates, the PN generators may be provided at different rates as a means of distinguishing the auxiliary information signals at a decoder. If all of the PN generators operate at the same rate, then their PN sequences will preferably all be orthogonal with respect to each other to facilitate distinguishing the different input data streams at the decoder, in accordance with well known spread spectrum demodulation techniques.

A variable gain stage can be provided after any or all of the multipliers 286, 296 and 306 for adjusting the gain of the corresponding spread spectrum signal in each path. Such gain stages 287, 297 and 307 are illustrated in FIG. 11. The gain of any path can be adjusted based on the gain(s) of any of the other paths, in order to provide the different auxiliary information signals at desired levels in the primary data signal. Allocation of the total combined signal gain among the auxiliary information signals in each path is provided by a gain analyzer and control processor 309 that sets and maintains a relative signal strength among the multiple streams and can independently adjust the appropriate gain stage(s) 287, 297 and/or 307 for adjusting the gain in each path. A control input 310 is provided to enable manual or dynamic adjustment of the relative signal strength among the data streams. For example, a manual adjustment can be effected upon the installation of the apparatus. Alternatively, or in addition to a manual adjustment, dynamic control can be provided during the operation of the system.

The combined, gain adjusted spread spectrum signals output from combiner 288 are spectrally shaped in LPC synthesis filter 266 to simulate the spectral shape of the primary data signal. The resultant colored noise output is combined with the primary data signal in combiner 268 for D/A conversion (if necessary) in converter 270. It should be appreciated that instead of LPC analysis and filtering as illustrated in FIG. 11, any other suitable spectral shaping technique such as subband coding or bandpass filtering can be used.

A power control circuit (not shown) such as power estimate and control circuit 96 of FIG. 5 can be used in the encoder of FIG. 11 to control the power of all of the auxiliary information signals as a group at the output of LPC synthesis filter 266. Such a power control circuit will enable the combined auxiliary information signals to be added to the primary data signal at a desired level, e.g., at a particular level below or above an acceptable interference threshold.

The combined signals provided by either of the encoders illustrated in FIGS. 10 and 11 can be recovered using a decoder of the type illustrated in FIG. 6. The decoder of FIG. 6 includes a selection control 128 that provides PN generator 118 with the necessary PN sequence to recover a desired one of the auxiliary information signals. For example, if it is desired to recover the auxiliary information input to terminal 290 of FIG. 11, selection control 128 of FIG. 6 will provide PN generator 118 with the information necessary to generate pseudorandom sequence $PN_2$, which is the sequence output by PN generator 294 in the encoder of FIG. 11.

Figure 12:
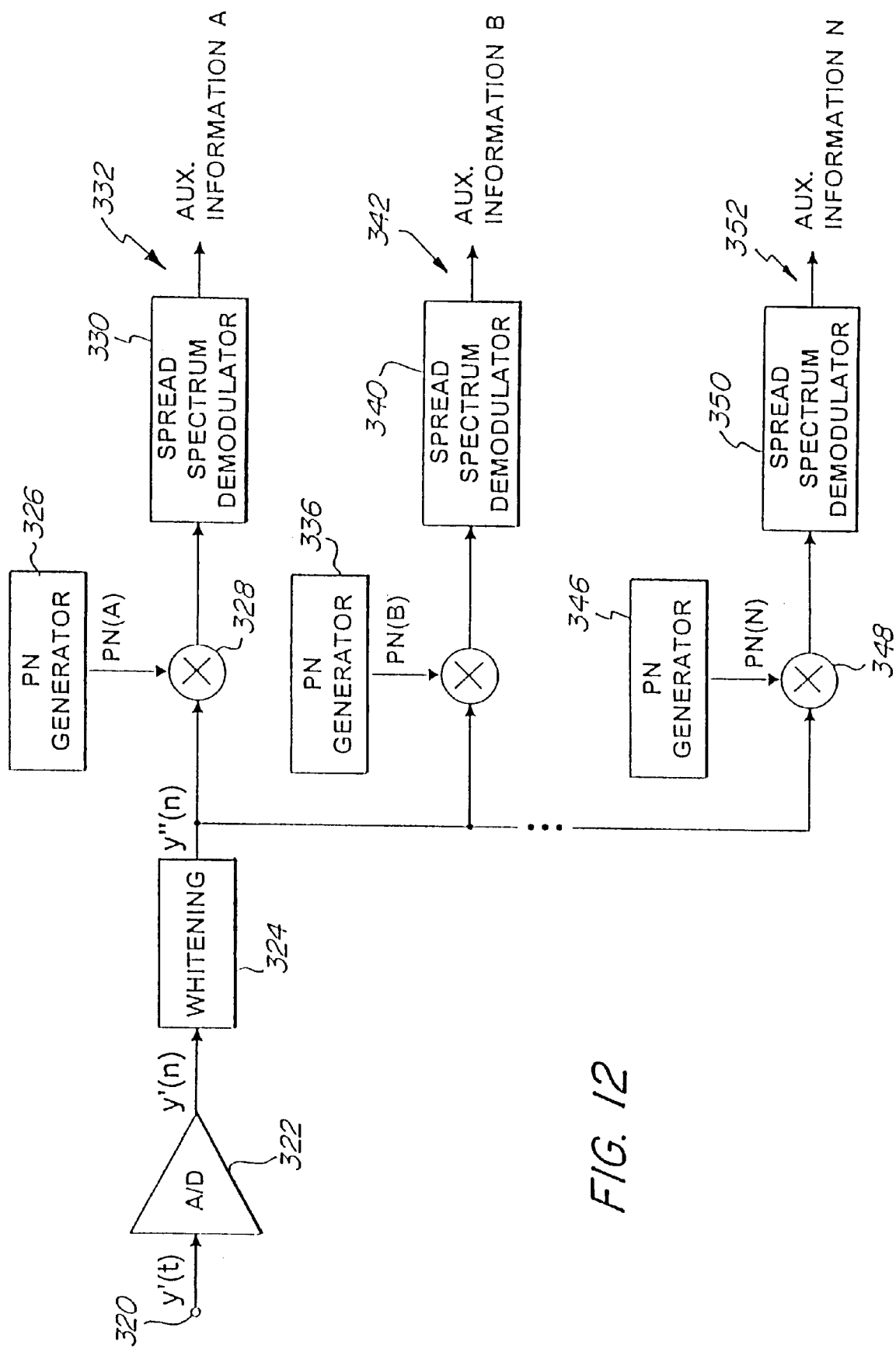
FIG. 12 is a block diagram of a decoder for simultaneously decoding a plurality of different auxiliary information signals embedded in a primary data signal.

FIG. 12 shows an embodiment wherein the decoder of FIG. 6 is modified to simultaneously decode a plurality of auxiliary information signals carried by the primary data signal. More particularly, the decoder of FIG. 12 receives, via terminal 320, the primary data signal having the auxiliary information signals hidden thereon as colored noise. If necessary, the input signal y'(t) is converted to the digital domain by an A/D converter 322. The resultant signal y'(n) is whitened using any available technique such as LPC analysis and prediction as shown by elements 114 and 116 in FIG. 6, by subband coding as illustrated by FFT processors 196, 198 and 202 of FIG. 9, by providing banks of bandpass filters for frequency filtering within the primary data signal bandwidth, or by any other suitable spectral shaping or filtering scheme. The decoder of FIG. 12 includes a plurality of stages 332, 342, 352, each receiving the whitened input signal y"(n). Each stage includes a PN generator (326, 336, 346) for recovering one of the plurality of auxiliary information signals. The PN generators can differentiate among the signals using any of a variety of techniques. For example, a different PN sequence can be used for each auxiliary information signal or different PN rates could be used to differentiate the signals. If the same PN rate is used for the different auxiliary information signals, then the PN sequences used will preferably all be orthogonal with respect to each other to facilitate signal differentiation and recovery.

The PM sequence output from each PN generator is input to a respective multiplier 328, 338, 348 that also receives the whitened primary data signal y"(n). The resultant output from each multiplier is input to a respective spread spectrum demodulator 330, 340 and 350 that outputs the corresponding auxiliary information signal. More particularly, stage 332 outputs auxiliary information signal "A" recovered using PN sequence PN(A), stage 342 outputs auxiliary information signal "B" using sequence PN(B), and stage 352 outputs auxiliary information signal "N" using sequence PN(N). The demodulators 330, 340 and 350 can comprise any suitable spread spectrum demodulator, such as the equivalent of "integrate and dump" components 122 and 124 shown in FIG. 6. Any required further processing of the signals output from the demodulators, such as FEC decoding, will be provided in a conventional manner.

The various other encoders and decoders illustrated in the figures can be similarly modified to handle multiple data streams embedded on one primary data signal. For example, the encoder of FIG. 3 can be provided with a plurality of stages, each comprising a separate PN generator 48, multiplier 46 and if necessary, A/D converter 50, for outputting different auxiliary information streams to combiner 52. Any required A/D conversion could alternatively be provided after the combiner. The decoder of FIG. 4 would be provided with a plurality of corresponding stages each having a PN generator 66, multiplier 64 and integrate and dump stage 68 for recovering the different auxiliary information signals carried with the primary data signal. Any necessary gain and power control components would also be included in the various encoder stages to provide the auxiliary information signals at the desired level(s) within the primary data signal.

Figure 13A:
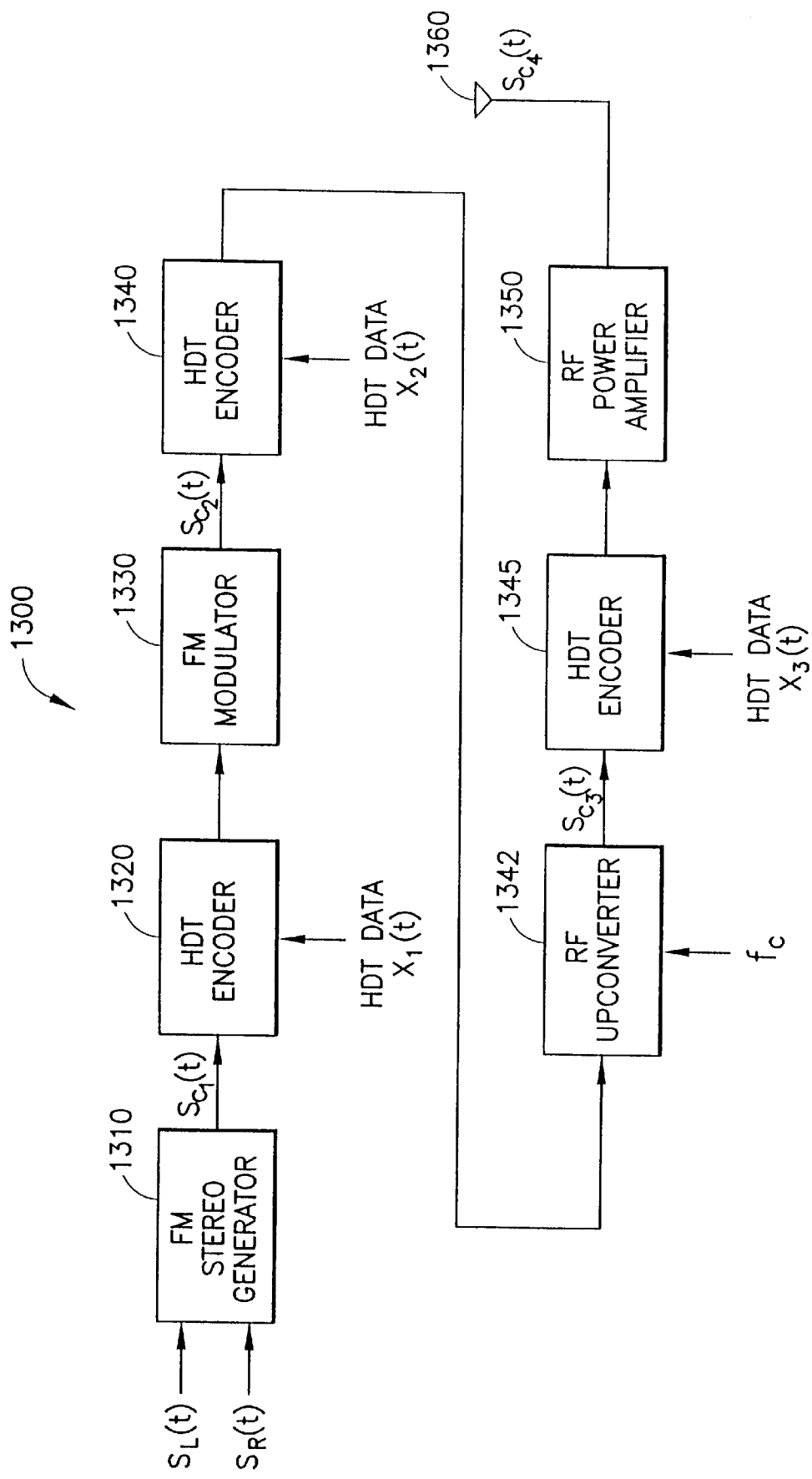
FIG. 13(a) is a block diagram of a transmitter for using a hidden data transport encoder with a frequency-modulated (FM) stereo primary data signal.

FIG. 13(a) is a block diagram of a transmitter for using a hidden data transport encoder with a frequency-modulated (FM) stereo primary data signal. With this arrangement, HDT data such as a station identifier, user identifier, mobile unit identifier, time of day, or other ancillary data can be embedded in a primary data signal such as an audio signal after the audio has been modulated, for example, using frequency modulation. Moreover, the HDT data can be embedded in the baseband signal, FM modulated signal, and/or radio frequency (RF) signal.

The transmitter, shown generally at 1300, includes an FM stereo generator 1310 which receives baseband left and right channel signals of a stereo primary data signal. The left channel signal, $s_L(t)$, and right channel signal, $s_R(t)$, are processed by the FM stereo generator 1310 in a conventional manner to provide the signal $s_{C1}(t)$. The spectral shape of $s_{C1}(t)$, given by $S_{C1}(f)$ as shown in FIG. 13(b), generally will not resemble the spectral shape of the baseband audio input.

Figure 13B:
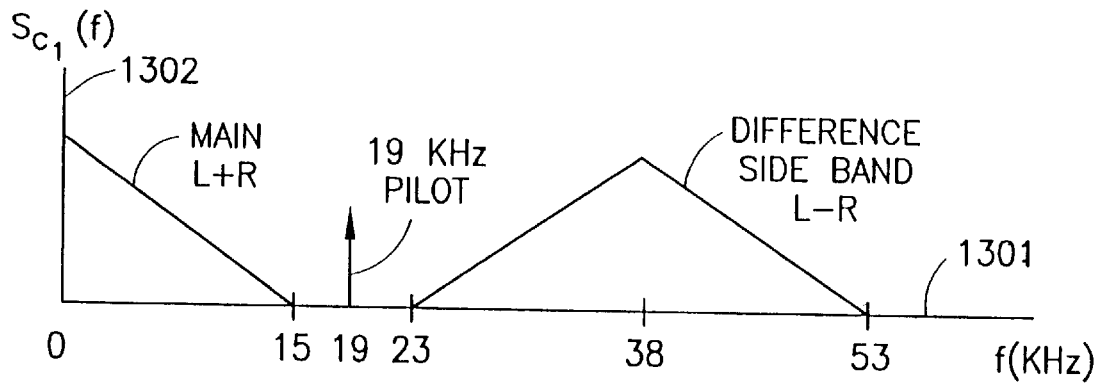
FIG. 13(b) shows the frequency spectrum of the composite FM signal of FIG. 13(a)

FIG. 13(b) shows the frequency spectrum of the composite FM signal of FIG. 13(a). The drawing is not to scale. The horizontal axis 1301 indicates the frequency in kHz, while the vertical axis 1302 indicates the magnitude of $S_{C1}(f)$, the frequency spectrum of $s_{C1}(t)$. The baseband spectrum (e.g., main spectrum), which comprises the sum of the left and right channels, L+R, is shown having a half bandwidth of 15 kHz. A pilot tone, which is at 19 kHz, may have a magnitude which is about ten percent that of the main signal. A difference sideband, which comprises the difference of the left and right channels, L–R, extends from 23 to 53 kHz.

Referring again to FIG. 13(a), the FM composite signal, $s_{C_1}(t)$, is optionally input to a first HDT encoder 1320 which also receives a first HDT data signal, $x_1(t)$ The HDT data is embedded into $s_{C_1}(t)$ using the techniques discussed previously. Additionally, $x_1(t)$ may be dynamically spectrally shaped to have a spectrum which resembles $s_{C_1}(f)$ using the techniques discussed previously. The FM composite signal with the first embedded HDT data is then provided to an FM modulator 1330 which modulates the composite signal to provide the signal $s_{C_2}(t)$.

Figure 13C:
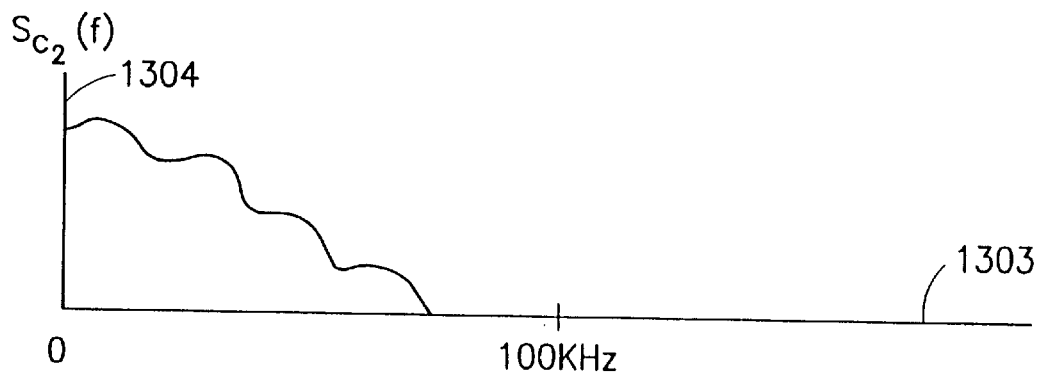
FIG. 13(c) shows the frequency spectrum of the FM modulated signal of FIG. 13(a) with first embedded auxiliary data.

FIG. 13(c) shows the frequency spectrum $S_{C_2}(f)$ of the FM modulated signal $s_{C_2}(t)$ of FIG. 13(a) with first embedded auxiliary data. The horizontal axis 1303 shows the frequency, while the vertical axis 1304 shows a representative magnitude of $S_{C_2}(f)$. The drawing is not to scale. The spectrum has a half bandwidth of 100 kHz or less.

Referring again to FIG. 13(a) additional HDT data can optionally be encoded on to $s_{C_2}(t)$ at the second HDT encoder 1340, which receives the HDT data signal $x_2(t)$. Moreover, $x_2(t)$ may be dynamically spectrally shaped to have a spectrum which resembles $S_{C_2}(f)$. The resulting signal output from the second HDT encoder 1340 is then provided to an RF upconverter 1342 for modulation at a carrier frequency, $f_c$, at which the signal will be transmitted. In the United States, 100 carrier frequencies are allocated for FM broadcasting in the range from 88.1 MHz to 107.9 MHz, and are equally spaced every 200 kHz. Moreover, each channel has a 200 kHz bandwidth. Note that spectral shaping of HDT data in accordance with the present invention can have a minimal or no impact on the primary stereo data signal.

Figure 13D:
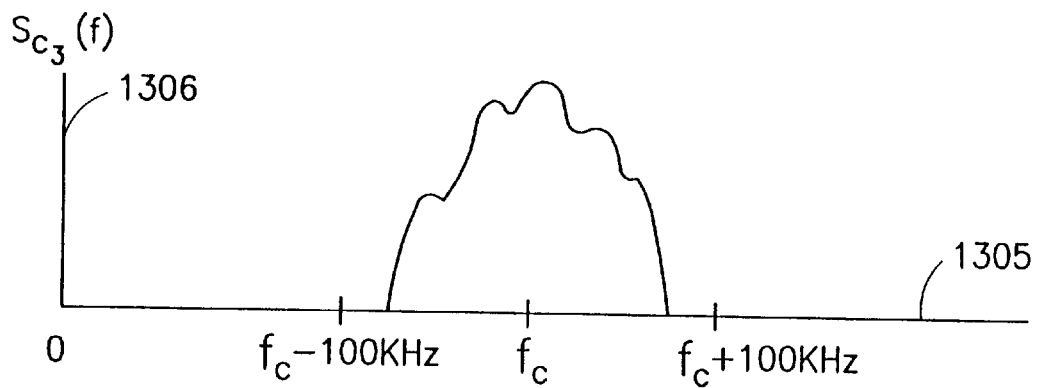
FIG. 13(d) shows the frequency spectrum of the RF upconverted data signal of FIG. 13(a) with first and second embedded auxiliary data.

FIG. 13(d) shows the frequency spectrum of the RF upconverted data signal $s_{C_3}(t)$ of FIG. 13(a) with first and second embedded auxiliary data. The horizontal axis 1305 shows the frequency, while the vertical axis 1306 shows the magnitude of the spectrum $S_{C_3}(f)$. The drawing is not to scale. The spectrum $S_{C_3}(f)$ is shown in the band from $f_c$−100 kHz to $f_c$+100 kHz. Adjacent channels which are not shown may also be present. For example, an adjacent lower channel will have a carrier frequency of $f_c$−200 kHz, while an adjacent higher channel has a carrier frequency of $f_c$+200 kHz.

The signal $s_{C_3}(t)$ may optionally be provided to a third HDT encoder 1345 which receives a third HDT data signal $x_3(t)$. $x_3(t)$ may be dynamically spectrally shaped to have a spectrum which resembles $S_{C_3}(f)$. The resulting signal, which may have up to three layers of HDT data carried therein, is then provided to an RF power amplifier 1350, and the amplified signal $s_{C_4}(t)$, is provided to a transmitting antenna 1360. Subsequent layers of HDT data will not interfere with HDT data which may have already been embedded.

Figure 14:
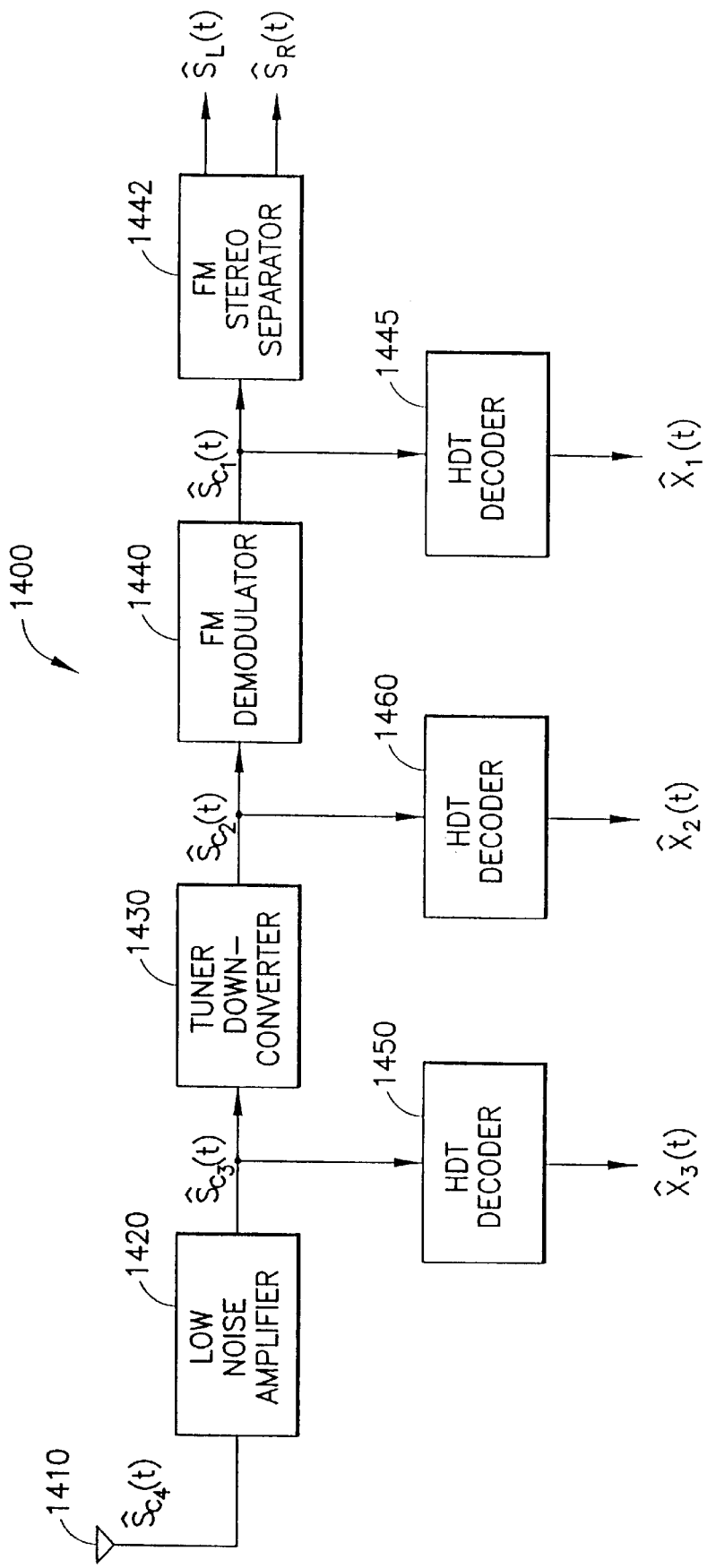
FIG. 14 is a block diagram of a receiver for use with the transmitter of FIG. 13(a).

FIG. 14 is a block diagram of a receiver for use with the transmitter of FIG. 13(a). The receiver, shown generally at 1400, receives the broadcast signal $\hat{s}_{C_4}(t)$ via an antenna 1410, and processes $\hat{s}_{C_4}(t)$ at a low noise amplifier 1420. The resulting signal, $\hat{s}_{C_3}(t)$, is then provided to a tuner downconverter 1430 and an HDT decoder 1450. The HDT decoder 1450 recovers the third HDT data $\hat{x}_3(t)$, if present, using the techniques discussed previously. The tuner downconverter 1430 downconverts the RF upconverted data signal to recover $\hat{s}_{C_2}(t)$, which may have the second embedded HDT data. The recovered signal is provided to the HDT decoder 1460 and an FM demodulator 1440. The HDT decoder 1460 recovers the second HDT data $\hat{x}_2(t)$, if present, while the FM demodulator 1440 recovers the signal $\hat{s}_{C_1}(t)$. The HDT decoder 1445 processes $\hat{s}_{C_1}(t)$ to recover the first HDT data $\hat{x}_1(t)$. Finally, the FM stereo separator 1442 processes $\hat{s}_{C_1}(t)$ to recover the left- and right-channel baseband data signals, $\hat{s}_L(t)$ and $\hat{s}_R(t)$, respectively.

Thus, it is possible to add HDT data to a primary data signal at baseband, and/or after one or more processing or modulation steps. For example, HDT data which provides copy protection or identifies an author of a primary data signal which comprise a musical passage may be most advantageously added at baseband or after generation of the composite stereo signal, while HDT data which provides a station identifier of a radio station may be most advantageously added after the stereo signal has been FM modulator or upconverted to a carrier frequency for broadcast. Alternatively, the station identifier data may be added after the composite stereo signal is generated, but before modulation by the carrier frequency, when a microwave link is used to transmit the stereo composite signal from a recording studio, for example, to an FM modulator or upconverter which may be located several miles away at a transmitting antenna.

It should now be appreciated that the present invention provides methods and apparatus for transporting auxiliary information in virtually any type of primary data signal. The auxiliary information is transported as colored noise, which is spectrally shaped to simulate the spectral shape of the primary data signal. The spectral shaping can be provided by any number of means, including LPC filtering and subband coding techniques. PN generators can be used to provide the auxiliary information in the form of spread spectrum signals that are subsequently spectrally shaped. Additionally, in any of the embodiments discussed herein, the spread spectrum signal may further be power adjusted, either before or after being spectrally shaped. Furthermore, in order to provide for the secure transmission of the auxiliary information, the PN generators can be keyed cryptographically, so that the counterpart PN sequence cannot be generated at a decoder without the corresponding cryptographic key. Moreover, a specific application for copy-protection of audio signals has been discussed.

Although the invention has been disclosed in connection with various specific embodiments, it will be appreciated by those skilled in the art that numerous adaptations and modifications may be made thereto without departing from the spirit and scope of the invention as set forth in the claims.

We claim:

1. A method for transporting auxiliary information in a primary data signal, comprising the steps of:

modulating a pseudorandom noise carrier by said auxiliary information to provide a spread spectrum signal carrying said information on a carrier portion thereof;

evaluating said primary data signal using time domain modeling to obtain an approximation of its spectral shape; and using time domain synthesis which is responsive to said time domain modeling to provide the carrier portion of said spread spectrum signal with a spectral shape which simulates the spectral shape of said primary data signal, thereby producing a noise signal containing said auxiliary information to be carried in said primary data signal.

2. A method in accordance with claim 1, wherein:

said noise signal has an adjusted power so that it is provided at a desired level in said primary data signal; and said power-adjusted noise signal is combined with said primary data signal to produce an output signal carrying said auxiliary information as noise in said primary data signal.

3. A method for recovering said auxiliary information from a received primary data signal carrying the noise signal of claim 1, comprising the steps of:
  evaluating said received primary data signal using time domain modeling to approximate its spectral shape;
  processing the received primary data signal, based on the approximate spectral shape determined therefore to whiten the noise signal contained therein; and
  demodulating the whitened noise signal to recover said auxiliary information.

4. A method in accordance with claim 1, wherein said primary data signal comprises a stereo frequency-modulated signal which is modulated at a carrier frequency for transmission at said carrier frequency, comprising the further step of:
  carrying said noise signal in at least one of: (a) said stereo frequency-modulated signal prior to said modulation at said carrier frequency, and (b) said stereo frequency-modulated signal subsequent to said modulation at said carrier frequency.

5. A method in accordance with claim 3 wherein:
  said received primary data signal comprises the sum of said noise signal and said primary data signal.

6. A method in accordance with claim 3 wherein:
  said time domain modeling comprises linear predictive coding (LPC) to provide LPC coefficients for use during said using step and said whitening step.

7. A method in accordance with claim 6 wherein:
  the LPC coefficients used during said whitening step are derived from said received primary data signal independently of the derivation of the LPC coefficients used during said using step.

8. A method in accordance with claim 1 wherein a plurality of auxiliary information signals are transported on said primary data signal, said method comprising the further steps of:
  modulating a plurality of pseudorandom noise carriers by said plurality of auxiliary information signals to provide a plurality of spread spectrum signals;
  providing said plurality of pseudorandom noise carriers with a spectral shape to simulate the spectral shape of said primary data signal; and
  combining the plurality of pseudorandom noise carriers with said primary data signal to produce an output signal carrying said auxiliary information signals as noise in said primary data signal.

9. A method in accordance with claim 8 wherein each of said plurality of pseudorandom noise carriers is individually spectrally shaped prior to its combination with said primary data signal.

10. A method in accordance with claim 8 wherein said plurality of pseudorandom noise carriers are spectrally shaped as a group prior to their combination with said primary data signal.

11. A method in accordance with claim 8 wherein:
  at least one of said plurality of pseudorandom noise carriers is individually spectrally shaped prior to its combination with said primary data signal, and
  at least two other of said plurality of pseudorandom noise carriers are spectrally shaped as a group prior to their combination with said primary data signal.

12. A method in accordance with claim 8 wherein:
  the plurality of pseudorandom noise carriers are combined with said primary data signal such that at least one of said plurality of pseudorandom noise carriers is combined with said primary data signal after said primary data signal has already been combined with at least one other of said plurality of pseudorandom noise carriers.

13. A method in accordance with claim 8 comprising the further step of providing at least one of a modulated or unmodulated pseudorandom noise carrier as a pilot signal for use in synchronizing a receiver function.

14. A method in accordance with claim 8, comprising the further step of:
  adjusting the gain of at least one of said plurality of pseudorandom noise carriers prior to its combination with said primary data signal.

15. A method in accordance with claim 14, wherein:
  a group of said plurality of pseudorandom noise carriers has an adjusted power so that the group is provided at a desired level in said primary data signal.

16. A method in accordance with claim 8, wherein:
  a gain of at least a first one of the plurality of pseudorandom noise carriers is determined; and
  a gain of at least a second one of the plurality of pseudorandom noise carriers is adjusted in response to the gain determined for the at least one first carrier.

17. A method in accordance with claim 16, wherein:
  a group of at least said first and second pseudorandom noise carriers has an adjusted power so that the group is provided at a desired level in said primary data signal.

18. A method in accordance with claim 8 wherein at least two of said plurality of pseudorandom noise carriers are provided at different data rates.

19. A method for recovering said auxiliary information from the output signal of claim 8 comprising the steps of:
  evaluating said output signal to approximate its spectral shape;
  processing the output signal based on the approximate spectral shape determined therefor, to whiten said noise; and
  demodulating a desired spread spectrum signal after said noise has been whitened to recover the auxiliary information carried thereby.

20. A method in accordance with claim 19 wherein a plurality of said spread spectrum signals are demodulated substantially simultaneously from said output signal.

21. A method in accordance with claim 1 wherein said pseudorandom noise carrier is generated cryptographically to provide secure communication of said auxiliary information to a receiver.

22. A method for transporting a plurality of auxiliary information signals in a primary data signal, comprising the steps of:
  modulating each of a plurality of pseudorandom noise carriers by at least one different one of said auxiliary information signals to provide a plurality of spread spectrum signals carrying auxiliary information on carrier portions thereof;
  evaluating said primary data signal using subband analysis to estimate its spectral shape;
  subband filtering said plurality of spread spectrum signals in response to said subband analysis to provide the carrier portions of said spread spectrum signals with a spectral shape which simulates the spectral shape of said primary data signal; and
  combining the carrier portions with said primary data signal to produce an output signal carrying said auxiliary information signals as noise in said primary data signal.

23. A method in accordance with claim 22 wherein said evaluating and subband filtering steps comprise fast Fourier transform (FFT) analysis and FFT filtering, respectively.

24. A method in accordance with claim 22 wherein each of said carrier portions is individually spectrally shaped prior to its combination with said primary data signal.

25. A method in accordance with claim 22 wherein said carrier portions are spectrally shaped as a group prior to their combination with said primary data signal.

26. A method in accordance with claim 22 wherein:
at least one of said carrier portions is individually spectrally shaped prior to its combination with said primary data signal, and
at least two other of said carrier portions are spectrally shaped as a group prior to their combination with said primary data signal.

27. A method in accordance with claim 22 wherein:
at least one of said carrier portions is combined with said primary data signal after said primary data signal has already been combined with at least one other of said carrier portions.

28. A method in accordance with claim 22 comprising the further step of providing at least one of a modulated or unmodulated pseudorandom noise carrier as a pilot signal for use in synchronizing a receiver function.

29. A method in accordance with claim 22, wherein:
at least one of said carrier portions has an adjusted power.

30. A method in accordance with claim 29, wherein:
a group of said carrier portions has an adjusted power so that said group is provided at a desired level in said primary data signal.

31. A method in accordance with claim 22, wherein:
a gain of at least a first one of the carrier portions is determined; and
a gain of at least a second one of the carrier portions is adjusted in response to the gain determined for the at least one first carrier portion.

32. A method in accordance with claim 31, wherein:
a group of at least said first and second carrier portions has an adjusted power so that the group is provided at a desired level in said primary data signal.

33. A method in accordance with claim 22 wherein at least two of said carrier portions are provided at different data rates.

34. A method for recovering said auxiliary information from the output signal of claim 22 comprising the steps of:
evaluating said output signal to approximate its spectral shape;
processing the output signal, based on the approximate spectral shape determined therefor, to whiten said noise; and
demodulating a desired spread spectrum signal after said noise has been whitened to recover the auxiliary information carried thereby.

35. A method in accordance with claim 34 wherein a plurality of said spread spectrum signals are demodulated substantially simultaneously from said output signal.

36. Apparatus for transporting auxiliary information in a primary data signal for communication to a receiver, comprising:
means for converting a data stream of said auxiliary information into a spread spectrum signal carrying said information;
means for evaluating said primary data signal using time domain modeling to obtain an approximation of its spectral shape; and
a time domain synthesizer responsive to said evaluating means for providing a carrier portion of said spread spectrum signal with a spectral shape which simulates the spectral shape of said primary data signal, thereby producing a noise signal containing said auxiliary information to be carried in said primary data signal.

37. Apparatus in accordance with claim 36 further comprising:
means for combining said noise signal with said primary data signal to produce an output signal carrying said auxiliary information as noise in said primary data signal.

38. Apparatus in accordance with claim 37, further comprising:
means for providing said noise signal with an adjusted power so that said noise signal is provided at a desired level in said primary data signal.

39. Apparatus in accordance with claim 36 wherein:
said evaluating means comprise a linear predictive coding (LPC) processor coupled to receive said primary data signal and generate LPC coefficients therefrom; and
said time domain synthesizer comprises an LPC filter responsive to said LPC coefficients.

40. Apparatus for recovering said auxiliary information from a received primary data signal carrying the noise signal provided by the apparatus of claim 36, comprising:
means for evaluating said received primary data signal using time domain modeling to approximate its spectral shape;
a time domain processor for processing the received primary data signal, based on the spectral shape determined therefor, to whiten the noise signal contained therein; and
means for demodulating the whitened noise signal to recover said data stream of said auxiliary information.

41. Apparatus in accordance with claim 40, wherein:
said primary data signal is a stereo frequency-modulated signal which is subsequently modulated at a carrier frequency for transmission at said carrier frequency; and
said noise signal is carried in at least one of: (a) said stereo frequency-modulated signal prior to said modulation at said carrier frequency, and (b) said stereo frequency-modulated signal subsequent to said modulation at said carrier frequency.

42. Apparatus in accordance with claim 40 wherein:
said means for evaluating said primary data signal comprise a first linear predictive coding (LPC) processor coupled to receive said primary data signal and generate first LPC coefficients therefrom;
said time domain synthesizer comprises a first LPC filter responsive to said first LPC coefficients;
said means for evaluating said received primary data signal comprise a second LPC processor for generating second LPC coefficients from the received primary data signal; and
said time domain processor comprises a second LPC filter responsive to said second LPC coefficients.

43. Apparatus in accordance with claim 42 further comprising:
means for providing said noise signal with an adjusted power to render said noise signal at a desired level in said primary data signal.

44. Apparatus for transporting a plurality of auxiliary information streams in a primary data signal, comprising:

means for converting said plurality of auxiliary information streams into spread spectrum signals;

means for evaluating said primary data signal to obtain an approximation of its spectral shape; and means responsive to said evaluating means for providing carrier portions of said spread spectrum signals with a spectral shape which simulates the spectral shape of said primary data signal;

wherein a combination of said spread spectrum signals is used to provide noise simulating the spectral shape of said primary data signal for carrying said auxiliary information in said primary data signal.

45. Apparatus in accordance with claim 44 further comprising:

means for providing at least one of said carrier portions with an adjusted gain.

46. A method in accordance with claim 45, further comprising:

means for providing a group of said carrier portions with an adjusted power so that said group is provided at a desired level in said primary data signal.

47. Apparatus in accordance with claim 44, further comprising:

means for determining a gain of at least one first carrier to be carried in said primary data signal; and means for providing at least one second carrier to be carried in said primary data signal with an adjusted gain which is responsive to the gain determined for said at least one first carrier.

48. Apparatus in accordance with claim 47 further comprising:

means for providing a group of at least said first and second carriers with an adjusted power so that the group is provided at a desired level in said primary data signal.

49. Apparatus in accordance with claim 44 wherein:

said means for evaluating said primary data signal use time domain modeling to obtain said approximation of the primary data signal spectral shape; and said means responsive to said evaluating means comprise a time domain synthesizer.

50. Apparatus in accordance with claim 44 wherein:

said means for evaluating said primary data signal use subband analysis to obtain said approximation of the primary data signal spectral shape; and said means responsive to said evaluating means comprise at least one subband filter.

51. Apparatus in accordance with claim 50 wherein said subband analyzer and subband filter comprise a fast Fourier transform (FFT) analyzer and filter, respectively.

52. Apparatus in accordance with claim 44 further comprising:

means for providing said noise with an adjusted power to render it at a desired level in said primary data signal.

53. Apparatus in accordance with claim 44 wherein:

said plurality of auxiliary information streams have different data rates; and said means for converting said auxiliary information streams into spread spectrum signals comprise pseudorandom sequence generators providing different output rates for the different information streams.

54. Apparatus in accordance with claim 44 wherein:

said means for converting said auxiliary information streams into spread spectrum signals comprise pseudorandom sequence generators providing orthogonal pseudorandom sequences for the different information streams.

55. A decoder for recovering auxiliary information carried by a spread spectrum signal that is transported as noise in a primary data signal, said spread spectrum signal including a carrier having a spectral shape which simulates the spectral shape of information contained in said primary data signal, said decoder comprising:

means for evaluating said primary data signal using time domain modeling to approximate its spectral shape;

a time domain processor for processing the primary data signal, based on the spectral shape determined therefor, to whiten the spread spectrum carrier contained therein; and means for demodulating the whitened spread spectrum carrier to recover said auxiliary information.

56. A decoder in accordance with claim 55 wherein:

said evaluating means comprise a linear predictive coding (LPC) processor coupled to receive said primary data signal and generate LPC coefficients therefrom; and said time domain processor comprises an LPC filter responsive to said LPC coefficients.

57. A decoder in accordance with claim 55 wherein:

a plurality of auxiliary information signals are carried on respective carriers of said spread spectrum signal, all of said carriers having a spectral shape which simulates the spectral shape of said primary data signal information; and said demodulator means include means for selecting at least one desired carrier for demodulation to enable the recovery of at least one corresponding auxiliary information signal.

58. A decoder in accordance with claim 56 wherein:

a plurality of auxiliary information signals are carried on respective carriers of said spread spectrum signal, all of said carriers having a spectral shape which simulates the spectral shape of said primary data signal information; and said demodulator means include means for substantially simultaneously demodulating a plurality of said carriers to enable the substantially simultaneous recovery of said auxiliary information signals.

59. A decoder for recovering a plurality of auxiliary information streams carried by a spread spectrum signal that is transported as noise in a primary data signal, said spread spectrum signal including a plurality of carriers having a spectral shape which simulates the spectral shape of information contained in said primary data signal, said decoder comprising:

means for evaluating said primary data signal to determine its approximate spectral shape;

means for processing the primary data signal, based on the spectral shape determined therefor, to whiten the spread spectrum carriers contained therein; and means for demodulating the whitened spread spectrum carriers to recover said auxiliary information streams.

60. A decoder in accordance with claim 59 wherein:

said evaluating means comprise a linear predictive coding (LPC) processor coupled to receive said primary data signal and generate LPC coefficients therefrom; and said processing means comprise an LPC filter responsive to said LPC coefficients.

61. A decoder for recovering auxiliary information carried by a spread spectrum signal transported as noise in a primary data signal, comprising:

means for whitening a spectrum of said primary data signal, said whitening means creating intersymbol interference in said spread spectrum signal; and a rake receiver for receiving and demodulating said primary data signal from said whitening means; wherein:

said rake receiver has a plurality of fingers for processing different multipaths of said spread spectrum signal when demodulating the received primary data signal, thereby recovering said spread spectrum signal with reduced intersymbol interference in order to obtain said auxiliary information therefrom;

said spread spectrum signal is provided by modulating a pseudorandom noise carrier by said auxiliary information; and a carrier portion of said spread spectrum signal has a spectral shape that approximates a spectral shape of said primary data signal.

62. A decoder in accordance with claim 61 wherein said whitening means comprise:

a linear predictive coding (LPC) processor coupled to receive said primary data signal and generate LPC coefficients therefrom, and an LPC filter of order N for receiving said primary data signal and responsive to said LPC coefficients for whitening said spectrum of said primary data signal;

said rake receiver comprising N fingers, where N is approximately equal to the order of said LPC filter.

63. A decoder in accordance with claim 61 wherein said whitening means comprise:

a subband analyzer coupled to receive and estimate the spectrum of said primary data signal; and a subband filter responsive to the spectrum estimated by said subband analyzer for filtering said primary data signal to whiten the spectrum thereof.

64. A decoder in accordance with claim 61 wherein each of said fingers has an associated weight, said rake receiver further comprising:

means for individually adjusting the weights of said rake receiver fingers.

65. A decoder in accordance with claim 64 wherein the weights of said rake receiver fingers are dynamically adjustable.

66. A decoder in accordance with claim 65 wherein said weights are dynamically adjustable in response to coefficients generated by said whitening means.

67. A data signal embodied in a carrier wave, comprising:

a primary data signal portion having an associated spectral shape; and a noise signal portion carried in said primary data signal; wherein:

said noise signal portion comprises a spread spectrum signal carrier that carries auxiliary information;

said spread spectrum signal carrier has an associated spectral shape which approximates said spectral shape of said primary data signal; and said spread spectrum signal carrier is provided with the associated spectral shape thereof by filtering said spread spectrum signal carrier with a time domain synthesis filter that is responsive to a time domain model of said spectral shape of said primary data signal.

68. The data signal of claim 67, wherein:

said spread spectrum signal carrier is provided by modulating a pseudorandom noise carrier by said auxiliary information.

69. The data signal of claim 67, wherein:

said noise signal portion comprises a plurality of spread spectrum signal carriers that carry corresponding auxiliary information signals; and said plurality of spread spectrum signal carriers are provided by modulating each of a corresponding plurality of pseudorandom noise carriers by a corresponding one of said auxiliary information signals.

\* \* \* \* \*